(12) United States Patent
Rewerts et al.

(10) Patent No.: US 12,491,979 B2
(45) Date of Patent: Dec. 9, 2025

(54) LOW-DENSITY FIXED-WING CARGO AIRCRAFT DESIGNS FOR ENCLOSED NON-BUOYANT TRANSPORTATION OF WIND TURBINE COMPONENTS

(71) Applicant: ZSM Holdings LLC, Dover, DE (US)

(72) Inventors: Scott David Rewerts, Summerfield, NC (US); Mark Emil Lundstrom, Boulder, CO (US)

(73) Assignee: ZSM Holdings LLC, Dover, DE (US)

( * ) Notice: Subject to any disclaimer, the term of this patent is extended or adjusted under 35 U.S.C. 154(b) by 0 days.

(21) Appl. No.: 18/549,314

(22) PCT Filed: Mar. 10, 2022

(86) PCT No.: PCT/US2022/019852
§ 371 (c)(1),
(2) Date: Sep. 6, 2023

(87) PCT Pub. No.: WO2022/192607
PCT Pub. Date: Sep. 15, 2022

(65) Prior Publication Data
US 2024/0166328 A1     May 23, 2024

Related U.S. Application Data

(60) Provisional application No. 63/159,442, filed on Mar. 10, 2021.

(51) Int. Cl.
| | |
|---|---|
| *B64C 1/22* | (2006.01) |
| *B64C 1/00* | (2006.01) |
| *B64C 39/02* | (2023.01) |

(52) U.S. Cl.
CPC ............. *B64C 1/22* (2013.01); *B64C 1/00* (2013.01); *B64C 39/02* (2013.01); *B64C 2001/0045* (2013.01)

(58) Field of Classification Search
CPC .. B64C 2001/0045; B64C 1/1415; B64C 1/22
See application file for complete search history.

(56) References Cited

U.S. PATENT DOCUMENTS

| | | |
|---|---|---|
| 2,134,260 A | 10/1938 | Nickerson |
| 2,998,948 A | 9/1961 | Sisk |

(Continued)

FOREIGN PATENT DOCUMENTS

| | | |
|---|---|---|
| RU | 2714176 C1 | 2/2020 |
| WO | 2022192607 A1 | 9/2022 |

OTHER PUBLICATIONS

No Author Listed. C-130J Super Hercules Brochure, Lockheed Martin.

(Continued)

*Primary Examiner* — Nicholas McFall
(74) *Attorney, Agent, or Firm* — Barnes & Thornburg LLP

(57) ABSTRACT

A fixed-wing, powered, non-buoyant, enclosed cargo aircraft design for carrying low-density wind turbine components is disclosed. The cargo aircraft can include a fuselage defining a forward end, an aft end, and a continuous interior cargo bay that spans almost all of a length of the fuselage from the forward end to the aft end, the cargo bay being capable of enclosing a maximum payload length approximately in the range of about 75 meters and about 125 meters. The aircraft is capable of short takeoff and landing (STOL) operations while carrying a maximum payload weight. The takeoff field length can be less than about 10 lengths of the maximum pay load length.

37 Claims, 25 Drawing Sheets

(56) References Cited

U.S. PATENT DOCUMENTS

| | | | |
|---|---|---|---|
| 3,073,586 | A | 1/1963 | Hartel |
| 3,374,972 | A | 3/1968 | Webb, Sr. |
| 4,195,693 | A | 4/1980 | Busch et al. |
| 6,311,106 | B1 | 10/2001 | Dupont |
| 8,100,362 | B2 | 1/2012 | Guering |
| 8,121,786 | B2 | 2/2012 | Morbey et al. |
| 8,366,050 | B2 | 2/2013 | Odle et al. |
| 8,387,917 | B1 | 3/2013 | Grip et al. |
| 2003/0080243 | A1 | 5/2003 | Hoisignton et al. |
| 2004/0200930 | A1 | 10/2004 | Bays-Muchmore et al. |
| 2007/0025832 | A1 | 2/2007 | Rawdon et al. |
| 2009/0173824 | A1 | 7/2009 | Perez-Sanchez |
| 2010/0252682 | A1 | 10/2010 | Pahl |
| 2012/0251280 | A1 | 10/2012 | Jaurand et al. |
| 2012/0316706 | A1* | 12/2012 | Guedes ................ G05D 1/0833 701/15 |
| 2015/0183519 | A1 | 7/2015 | Llamas Sandin |
| 2016/0311512 | A1 | 10/2016 | Sankrithi |
| 2018/0203471 | A1 | 7/2018 | Lesperance, Jr. et al. |
| 2019/0002076 | A1* | 1/2019 | Markley ................ B64C 5/02 |
| 2020/0207475 | A1 | 7/2020 | Dobberfuhl et al. |
| 2021/0129972 | A1 | 5/2021 | Sankrithi et al. |
| 2021/0380245 | A1 | 12/2021 | Rewerts et al. |

OTHER PUBLICATIONS

No Author Listed. DHC-4 A Caribou Brochure, The De Havilland Canada. Nov. 1962.

No Author Listed. Piasecki H-21 Helicopter, Wikipedia. Website. Accessed Oct. 29, 2021. url: <https://en.wikipedia.org/wiki/Piasecki_H-21>.

No Author Listed, "747-400/-400ER Freighters" StartupBoeing. May 2010.

No Author Listed, Antonov Airlines Brochure. Jul. 2019. [online] retrieved from <URL: https://www.antonov-airlines.com/wp-content/uploads/2019/07 /Antonov-Airlines- brochure.pdf>.

Boeing Pelican Cargo Aircraft Pictures Facts History from Boeing Phantom Works, Aviation Explorer, archieved in Dec. 18, 2018 at Internet Archives, http://web.archive.org/web/20181218154546/http://www.aviationexplorer.com/boeing_pelican_facts.htm (Year: 2018).

C-130J Super Hercules Whatever the Situation, We'll Be There. Lockheed Martin Corporation, archieved on Apr. 6, 2019 at Internet Archives http://web.archive.org/web/20190406105924/http://www.lockheedmartin.com/content/dam/lockheed-martin/aero/documents/C-130J/C130JPocketGuide.pdf (Year: 2019).

International Search Report and Written Opinion for Application No. PCT/US20/49787, mailed Nov. 30, 2020 (20 pages).

International Search Report and Written Opinion for Application No. PCT/US2021/021792, mailed May 20, 2021 (12 pages).

International Search Report and Written Opinion for Application No. PCT/US2022/019853 dated Nov. 15, 2022 (17 pages).

International Preliminary Report on Patentability Chapter 1 for Application No. PCT/US2022/019853 dated Sep. 12, 2023 (14 pages).

The Lockheed CL-1201 Flying Aircraft Carrier. Tails through Time, archieved on Mar. 1, 2016 at Internet Archives, https://web.archive.org/web/20160301011000/http://www.tailsthroughtimecom/2010/06/in-aviation-those-who-dar-to-dream-are.hmtl (Year: 2016).

European Search Report for Application No. EP 22768036, mailed Nov. 27, 2024 (10 pages).

* cited by examiner

LOW-DENSITY FIXED-WING CARGO AIRCRAFT DESIGNS FOR ENCLOSED NON-BUOYANT TRANSPORTATION OF WIND TURBINE COMPONENTS

CROSS-REFERENCE TO RELATED APPLICATIONS

This application is a U.S. national counterpart application of PCT International Application No. PCT/US2022/019852 filed Mar. 10, 2022, which claims priority to and the benefit of U.S. Provisional Patent Application Ser. No. 63/159,439, entitled "LOW-DENSITY FIXED-WING CARGO AIRCRAFT DESIGNS FOR ENCLOSED NON-BUOYANT TRANSPORTATION OF WIND TURBINE COMPONENTS" filed Mar. 10, 2021, the contents of which are incorporated by reference herein in their entirety.

FIELD

The present disclosure relates to a design for cargo aircraft, and more particularly to a combination of design parameters for non-buoyant, fixed-wing aircraft which lends itself towards transporting large, low-density cargo items such as wind turbine components while maintaining a short takeoff and landing capability.

BACKGROUND

Increases in global demand for wind energy has catalyzed the development of larger, better-performing wind turbines, as turbines with larger rotor diameters generally capture more wind energy. As turbines continue to improve, wind farm sites in previously undeveloped or underdeveloped locations become viable both onshore and offshore, including existing sites where older turbines need replacement.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Whether onshore or offshore, the road vehicle or ship options for transporting such equipment has become more limited, particularly as the size of wind turbines increase. The very long lengths of wind turbine blades (some are presently over 100 meters long and over 5 meters in diameter) make conventional transportation by train, truck, or ship very difficult. Unfortunately, the solution is not as simple as making vehicles longer and/or larger; a variety of complications present themselves as vehicles are made longer and/or larger, including but not limited to: load balancing of the vehicle, the payload, and/or the two with respect to each other; handling, maneuverability, and control of the vehicle; and other complications apparent to those skilled in the art.

Further, whether onshore or offshore, delivery of parts can be slow and severely limited by the accessibility of the site. Wind farm sites are often remote, and thus not near suitable transportation infrastructure, and new sites are often without any existing transportation infrastructure, thus requiring new construction and special equipment. Ultimately, transportation logistics become cost prohibitive, resulting in a literal and figurative roadblock to further advancing the use of wind energy on a global scale.

Existing cargo aircraft, including the largest aircraft ever to fly, are not able to transport extremely large cargo, even if that cargo is, in all dimensions, smaller than the aircraft itself. This limitation is often the result of cargo aircraft, even those purpose built to be cargo aircraft, not fully utilizing their overall size as cargo bay volume. Existing cargo aircraft designs neglect the criteria that, as detailed herein, are important for transporting extremely long wind turbine components, such as: (i) prioritizing cargo volume for low-density cargo rather than cargo mass for high-density cargo; (ii) maximizing the fraction of vehicle length which is cargo bay length; and/or (iii) minimizing the runway length and runway preparation needed for a given payload size. The present disclosure provides for an entirely new class of cargo aircraft design parameters that are significantly better suited for aerial transport of long, large volume, low-density cargo, flight over moderate ranges at moderate speeds, and short takeoff and landing (STOL) performance on semi-prepared runways all while providing transport of cargo at a length scale previously unexplored in aircraft design.

SUMMARY

Large cargo payloads that are significantly oversized in a single dimension (e.g., very long wind turbine blades) generally result in those payloads, when transported by aircraft, being arranged in the aircraft close to parallel to the direction of travel, and substantially orthogonal to the wing span direction or the height direction of a static aircraft on the ground. In other words, they are carried with the longest dimension being aligned with the longitudinal axis of the aircraft. However, even what was once the longest operational aircraft in the world, the Antonov AN-225, which was 84 meters long (about 275 feet) in total length from fuselage nose tip to fuselage tail tip, cannot stow cargo over about 43.6 meters long (about 143 feet), which is just over half of the total length of the AN-225 aircraft. While some smaller cargo aircraft have a larger maximum cargo length ratio, such as about 70% for the Boeing 747-400 (resulting in about 185 feet maximum cargo length), a common feature among these large cargo aircraft is a limited extension of the cargo bay into the aft section of the fuselage. While there may be many reasons for this limited extension and the maximum cargo length, the tailstrike requirement and a resulting reduction in the available volume in the aft fuselage reducing the usefulness of any portion of any extra aft cargo bay volume is likely a significant factor. Accordingly, there is a need for an entirely new design of large cargo aircraft capable of moving large and extremely long wind turbine blade payloads. Moreover, a number of factors lead to the aspects of the present disclosure. A plurality of these factors are discussed in more detail below to illustrate the nature of the problems addressed by the present disclosure.

Addressing the growing global demand for renewable energy: Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites in previously undeveloped locations become viable both onshore and offshore. These sites may also be existing sites, where older turbines need replacement by better-performing, more efficient turbines, and new sites.

Improving and expanding existing wind energy infrastructure: A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both roads and railways are limited by height and width of tunnels and bridges. Road transport has additional complications of lane width, road curvature, and the need to pass through urban areas that may require additional permitting and logistics, among other complications. Offshore wind turbines have their own challenges in establishing transmission infrastructure to bring power back onshore.

Opening new geographic locations for wind farms: Whether onshore or offshore, transporting such equipment has become more challenging, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; additional planning and permitting required for transportation; roadway transportation wear and tear; temporary roadway closure; infrastructure demolition and reconstruction; and other complications that would be apparent to those skilled in the art.

Reducing infrastructure costs of new wind farms: Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Additionally, onshore wind power installation sites are frequently subject to non-technical challenges such as difficulty in obtaining construction permits and municipal approval, strict land use regulations, public opposition, and a lack of unobstructed continuous land in areas with significant wind resources. These non-technical challenges may be facilitated by reducing the required runway length which is necessary to take off and land an aircraft fulfilling the transportation role. By reducing the required runway length, the transportation impacts are isolated to a smaller geographical area.

Expanding the scope of cargo capable of being moved by aircraft: Existing cargo aircraft, including the largest aircraft ever to fly (e.g., the Antonov An-225, the Boeing Dream-Lifter or the Airbus BelugaXL), are not able to transport extremely large cargo, even if that cargo is, in all dimensions, smaller than the aircraft fuselage itself. This limitation is often the result of cargo aircraft, even those purpose built to be cargo aircraft, not fully utilizing their overall size as cargo bay volume; however, even utilizing the full fuselage length, there are still no existing aircraft which are long enough to carry wind turbine components long enough to maximize the competitiveness of wind power.

Additionally, existing cargo aircraft are sized to carry a payload density (the payload mass capacity divided by the payload volume capacity) that is consistent with small, dense pallets of goods rather than large, low-density wind turbine components. Because the operating cost of an aircraft is only partially dependent upon weight, but also comprised of a minimum weight-independent component, flying these existing cargo aircraft with filled payload volume capacity at a small fraction of their payload mass capacity would not be profitable.

Improving the efficient of carrying large, low density cargo via aircraft: Another cause of this constraint that reduces the useful cargo-carrying length of an aircraft significantly below the aircraft's length is to optimize the aircraft for very high speed flight and flight over very long ranges by fairing the projected frontal area of the fuselage (and payload) to a close over longer distances to reduce vehicle drag. Vehicle drag—including the subsonic pressure component, viscous component and compressible component—can each be significantly optimized using an important parameter called fineness ratio (which is the inverse of the thickness ratio). The fineness ratio, which is the ratio of the dimensions orthogonal to the cross-section (such as length), divided by a maximum cross-sectional dimension such as width, height, or diameter. For a given payload with a fixed payload width/height/diameter, where the corresponding maximum fuselage width/height/diameter must be larger than the payload, the only way to increase fineness ratio (or decrease thickness ratio) is to increase fuselage length.

Many of the largest aircraft in existence today require special permissions to operate into or out of existing airports (or may not operate at some smaller airports at all). Airports are generally open to operations for aircraft by a classification called International Civil Aviation Organization (ICAO) Aircraft Group Code, which is in essence a measure of the size of an aircraft and varies from 1 (for extremely small general aviation aircraft) to 6 (for the largest aircraft that have ever operated, such as the Airbus A-380). There are examples of cargo aircraft that are outside of even the largest group code, such as the Antonov An-225. Regardless, the geometric constraints on aircraft that impact top level design for aircraft performance, stability and controls and outer mold line (OML) design include a wingspan limit and a height limit. Even for the largest existing aircraft in ICAO Group 6 and above ICAO Group 6, the maximum payload lengths are much too short for the cargo of interest in this disclosure (e.g., large wind turbine blade components).

Accordingly, there is a need for large, transport-category aircraft, capable of moving oversized cargo not traditionally shippable by air, which focuses specifically upon extremely large, low-density cargo into and out of existing airports and purpose-built semi-prepared airfields which are as short as feasible, at moderate airspeeds and moderate air ranges.

Embodiments of the present disclosure include fixed-wing cargo aircraft, with relatively rigid structures, that are capable of self-powered by propelling itself forwards and generating lift from the fixed wing. The cargo aircraft include a set of closed solid aircraft surfaces that fully contain a continuous interior cargo bay and protect the cargo from the external environment. The cargo aircraft can be propeller-driven, jet turbine driven, or utilize hybrid engines to provide thrust to propel the aircraft, and does not require an assisted takeoff (e.g., using a tow aircraft, catapult, or rockets). The cargo aircraft is non-buoyant, such that it utilizes no significant (~10% or more) buoyancy to achieve steady-state lift while in-flight.

Certain examples of the present disclosure include ultra-long and ultra-low density short takeoff and landing cargo aircraft capable of carrying the largest wind turbine blade (e.g., single blades over 75 m). Examples of the present disclosure include extremely large, non-buoyant, cargo aircraft capable of both carrying extremely long payloads and being able to take off and land at runways that are significantly shorter than those required by most, if not all, existing large aircraft. For purposes of the present disclosure, a large or long aircraft is considered an aircraft having a fuselage length from fuselage nose tip to fuselage tail tip that is at least approximately 60 meters long. The American Federal Aviation Administration (FAA) defines a large aircraft as any aircraft of more than 12,500 pounds maximum certificated takeoff weight, which can also be considered a large aircraft in the present context, but the focus of size is generally related to a length of the aircraft herein. One example of such an oversized payload capable of being transported using examples of this present disclosure are large wind turbine blades, which can be over 100 meters in length. Examples of the present disclosure enable a payload of such an extreme length to be transported within the cargo bay of an aircraft having a fuselage only slighter longer than the payload, while that aircraft can also takeoff and land at most existing commercial airports, as well as runways that are even smaller, for instance because they are built at a location for landing such cargo aircraft near a site where the cargo is to be used, such as a landing strip built as part of a wind farm.

Examples of the present disclosure include a fixed-wing, powered, non-buoyant, enclosed cargo aircraft for carrying low-density payloads. The cargo aircraft includes a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay. The fuselage includes a forward portion containing a forward region of the continuous interior cargo bay, the forward portion defining a forward centerline along a longitudinal-lateral plane of the cargo aircraft, an aft portion containing an aft region of the continuous interior cargo bay, the aft portion defining an aft centerline extending above the longitudinal-lateral plane of the cargo aircraft, and a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline. The maximum payload length is approximately in the range of about 75 meters to about 125 meters, and the aircraft is capable of short takeoff and landing (STOL) operation carrying a maximum payload weight.

The fuselage can include an empennage positioned vertically above the aft region of the continuous interior cargo bay. In some examples, the cargo aircraft defines a lateral pitch axis about which the cargo aircraft is configured to rotate a maximal degree during a STOL operation while the aircraft is on the ground without striking the fuselage on the ground, the aft portion an extend from the kinked portion at an angle approximately equal to the degree of maximal rotation of the aircraft during the takeoff operation, and the kinked portion can be approximately vertically aligned with the lateral pitch axis. In some examples, the aircraft defines a maximum payload length efficiency approximately in the range of about 90% to about 97%. The continuous interior cargo bay can be configured to transport wind turbine blades having a longest linear dimension up to the maximum payload length. In some examples, the continuous interior cargo bay defines a volume is between about 121,000 cubic feet and 561,000 cubic feet, the volume being approximately proportional to the maximum payload length.

Another example of a fixed-wing, powered, non-buoyant, enclosed cargo aircraft for carrying low-density payloads includes a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay. The aircraft is capable of short takeoff and landing (STOL) operation carrying a maximum payload weight, and the maximum payload length is approximately in the range of about 75 meters to about 125 meters. In some examples, the STOL operation comprises performing a taking off operation from a runway in less than about 2,500 feet carrying the maximum payload weight. In some examples, the STOL operation comprises performing a takeoff operation in less than about 10 times the maximum payload length. The continuous interior cargo bay can be configured to transport wind turbine blades having a longest linear dimension up to the maximum payload length. In some examples, continuous interior cargo bay defines a volume is between about 121,000 cubic feet and 561,000 cubic feet, the volume being approximately proportional to the maximum payload length. In some examples, maximum payload length is greater than approximately 105 meters and the continuous interior cargo bay defines a volume between about 333,000 cubic feet and 561,000 cubic feet, the volume being approximately proportional to the maximum payload length.

The fuselage can include an empennage positioned vertically above an aft portion of the continuous interior cargo bay. In some examples, takeoff operation at maximum payload weight corresponds to a fully loaded aircraft with a cargo bay volume density less than about 1.0 lbm/ft$^3$. The cargo aircraft can define a maximum payload length efficiency of greater than about 90%. In some examples, aircraft defines a maximum payload length efficiency approximately in the range of about 90% to about 97%. In some examples, an aft end of the continuous interior cargo bay is configured to receive an aft end of an elongated contiguous payload from a forward end of the fuselage to dispose the elongated contiguous payload throughout substantially all of a length of the continuous interior cargo bay, the elongated contiguous payload having a length equal to the maximum payload length. In some examples, the fuselage includes unswept first and second fixed wings are unswept.

In some examples, the aircraft comprises a configuration selected from the following group of configurations and resultant takeoff performance at maximum payload weight:
 the maximum payload length is approximately in the range of about 75 meters and about 85 meters and the aircraft is capable of performing a takeoff operation approximately in the range of within about 7.3 times and about 9.0 times the maximum payload length;

the maximum payload length is approximately in the range of about 85 meters and about 95 meters and the aircraft is capable of performing a takeoff operation approximately in the range of within about 6.5 times and about 7.3 times the maximum payload length;

the maximum payload length is approximately in the range of about 95 meters and about 105 meters and the aircraft is capable of performing a takeoff operation approximately in the range of within about 5.7 times and about 6.5 times the maximum payload length;

the maximum payload length is approximately in the range of about 105 meters and about 115 meters and the aircraft is capable of performing a takeoff operation approximately in the range of within about 5.3 times and about 5.7 times the maximum payload length; and the maximum payload length is approximately in the range of about 115 meters and about 125 meters and the aircraft is capable of performing a takeoff operation approximately in the range of within about 4.9 times and 5.3 times the maximum payload length.

The fuselage can include a forward portion containing a forward region of the continuous interior cargo bay, the forward portion defining a forward centerline along a longitudinal-lateral plane of the cargo aircraft, an aft portion containing an aft region of the continuous interior cargo bay, the aft portion defining an aft centerline extending above the longitudinal-lateral plane of the cargo aircraft, and a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline, and where the aft region of the continuous interior cargo bay extends along more than about 90% of a length of the aft portion of the fuselage.

In some examples, the cargo aircraft defines a lateral pitch axis about which the cargo aircraft is configured to rotate a maximal degree during a STOL operation while the aircraft is on the ground without striking the fuselage on the ground, with the aft portion extending from the kinked portion at an angle approximately equal to the degree of maximal rotation of the aircraft during the takeoff operation, and the kinked portion approximately vertically aligned with the lateral pitch axis. In some examples, bend angle is approximately in the range of about 4 degrees to about 16 degrees with respect to the longitudinal-lateral plane of the cargo aircraft. In some examples, the bend angle is approximately equal to the degree of maximal rotation of the aircraft during the STOL operation. In some examples, the bend angle is approximately equal to the degree of maximal rotation of the aircraft during the takeoff operation.

The fuselage can define a lateral pitch axis about which the cargo aircraft is configured to rotate a maximal degree during a STOL takeoff operation while the aircraft is still on the ground without striking the fuselage on the ground, the fuselage can include a forward portion containing a forward region of the continuous interior cargo bay, the forward portion defining a forward centerline along a longitudinal-lateral plane of the cargo aircraft; and an aft portion extending aft from the lateral pitch axis to the aft end and containing an aft region of the continuous interior cargo bay extending along a majority of a length of the aft portion of the fuselage, the aft portion defining an aft centerline extending above the longitudinal-lateral plane of the cargo aircraft, In some examples, an aft end of the aft region of the continuous interior cargo bay is configured to receive an aft end of an elongated contiguous payload from the forward end of the fuselage to dispose the elongated contiguous payload throughout substantially all of the length of the continuous interior cargo bay, where the elongated contiguous payload defines a maximum length approximately equal to the maximum payload length.

The forward end of the fuselage can include a cargo nose door configured to move to expose an opening into the continuous interior cargo bay through which an aft end of an elongate contiguous payload can be passed throughout substantially all of the length of the continuous interior cargo and to the aft end of the aft region of the continuous interior cargo bay.

In some examples, wherein the fuselage comprises a kinked portion forming a junction in the fuselage between the forward portion and the aft portion of the fuselage and between the forward and aft regions of the continuous interior cargo bay, where the kinked portion in the fuselage defines a bend angle between the forward centerline and the aft centerline, and where the kinked portion is approximately vertically aligned with the lateral pitch axis. In some examples, the aft portion extends from the kinked portion at an angle approximately equal to the degree of maximal rotation of the aircraft during the takeoff operation.

Yet another example of a fixed-wing, powered, non-buoyant, enclosed cargo aircraft for carrying low-density payloads includes a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay, with the aircraft being capable of short takeoff and landing (STOL) operation carrying a maximum payload weight, the continuous interior cargo bay defining a volume approximately in the range of about 121,000 cubic feet to about 561,000 cubic feet, and the maximum payload length being between about 75 meters and 125 meters, the maximum payload length being approximately proportional to the volume of the continuous interior cargo. In some examples, the STOL operation comprises performing a taking off operation from a runway in less than about 2,500 feet carrying the maximum payload weight. In some examples, the STOL operation comprises performing a takeoff operation in less than about 10 times the maximum payload length In some examples, the continuous interior cargo bay is configured to transport wind turbine blades having a longest linear dimension up to the maximum payload length. In some examples, the fuselage comprises an empennage positioned vertically above an aft portion of the continuous interior cargo bay. In some examples, the takeoff operation at maximum payload weight corresponds to a fully loaded aircraft with a cargo bay volume density less than about 1.0 lbm/ft$^3$.

The cargo aircraft can define a maximum payload length efficiency of greater than about 90%. In some examples, the aircraft defines a maximum payload length efficiency approximately in the range of about 90% to about 97%. In some examples, the fuselage comprises the first and second fixed wings are unswept.

Yet another example of the present disclosure is method of conducting a short runway takeoff operation for a fixed-wing, powered, non-buoyant, enclosed cargo aircraft sized and shaped to carry low-density payloads, the method includes accelerating the fixed-wing cargo aircraft, the cargo aircraft comprising a continuous interior cargo bay spanning more than a majority of a length of a fuselage of the aircraft from a forward end to an aft end and defining a maximum payload length approximately in the range of about 75 meters to about 125 meters, rotating the fixed-wing cargo aircraft about a lateral pitch axis while the aircraft is still on the ground without striking the fuselage on the ground, and lifting the aircraft off the ground after traversing less than about 10 payload lengths of runway. In some examples, the continuous interior cargo bay spans more than about 90% of the length of the fuselage. In some examples, the continuous interior cargo bay spans approximately in the range of about 90% to about 97% of the length of the fuselage. Lifting the aircraft off the ground can be done after traversing less than about 10 payload lengths of runway further includes traversing less than about 2,500 feet of runway. In some examples, the aircraft defines a fuselage kink approximately aligned with the lateral pitch axis such that the rotating orients aircraft aft of the fuselage kink approximately parallel with the ground.

In some examples, the continuous interior cargo bay defines a volume between about 121,000 cubic feet and 561,000 cubic feet, the volume being approximately proportional to the maximum payload length. In some examples, the continuous interior cargo pay contains a payload, defines a volume, and defines a payload volume density less than about 1.0 lbm/ft$^3$. In some examples, the accelerating the fixed-wing cargo is done entirely using air-breathing propulsion. In some examples, rotating the aircraft comprises applying a rotation force from an empennage positioned vertically above an aft portion of the continuous interior cargo bay. In some examples, the aircraft off the ground is done without using leading edge lift devices on primary wings of the aircraft.

BRIEF DESCRIPTION OF DRAWINGS

This disclosure will be more fully understood from the following detailed description taken in conjunction with the accompanying drawings, in which.

DETAILED DESCRIPTION

Figure 1A:
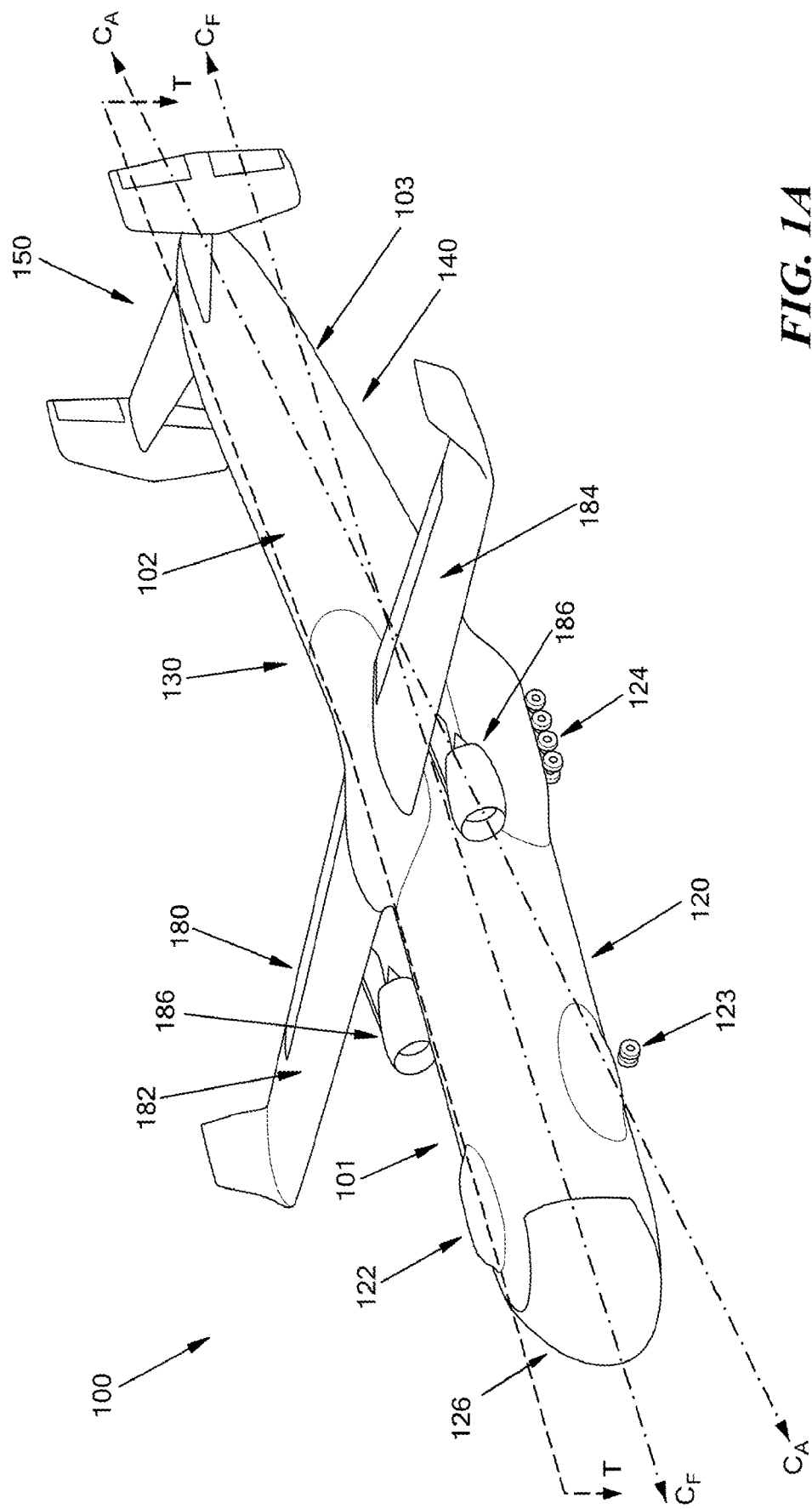
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into systems, methods, aircraft, and components related to each of the same.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward" and "aft," and will give terms of those nature their commonly understood meaning. Further, in some instances, terms like forward and proximal or aft and distal may be used in a similar fashion.

The present disclosure is related to large, transport-category aircraft (e.g., fixed-wing, non-buoyant, and multi-engine jet aircraft), capable of moving oversized cargo not traditionally shippable by air. For example, wind turbine blades, which are typically highly elongated and irregular in shape to provide greater electrical power generating efficiency, or similarly long industrial equipment, shipping containers, or military equipment. The present disclosure is not limited to these specific cargos or payloads, but rather, these are examples. Examples of the present disclosure include extremely long cargo aircraft (e.g., longer than 60 meters, or even longer than 84 meters) with a kink in the fuselage about the lateral pitch axis, which allows for the transportation of long payloads or cargos while also meeting the tail strike requirement by allowing the cargo to extend longitudinally aft and upwards to locations that are vertically above the upper surface of the forwards fuselage.

Existing fixed-wing cargo aircraft designs are suitable to carry dense payloads (e.g. over 5 lbs/ft$^3$) and operate using runways of typical modern airport length (e.g., over 7,500 feet). Existing techniques do not enable the design of extremely large cargo aircraft for carrying payloads over 75 m in length while also being capable of short takeoffs and landing performance. Aspects of the present invention provide for aircraft designs suitable for carrying ultra-long low density payloads while achieving short takeoff and landing performance. One such large cargo aircraft example of the present disclosure is illustrated in FIGS. 1A and 1B.

Aircraft

Figure 1B:
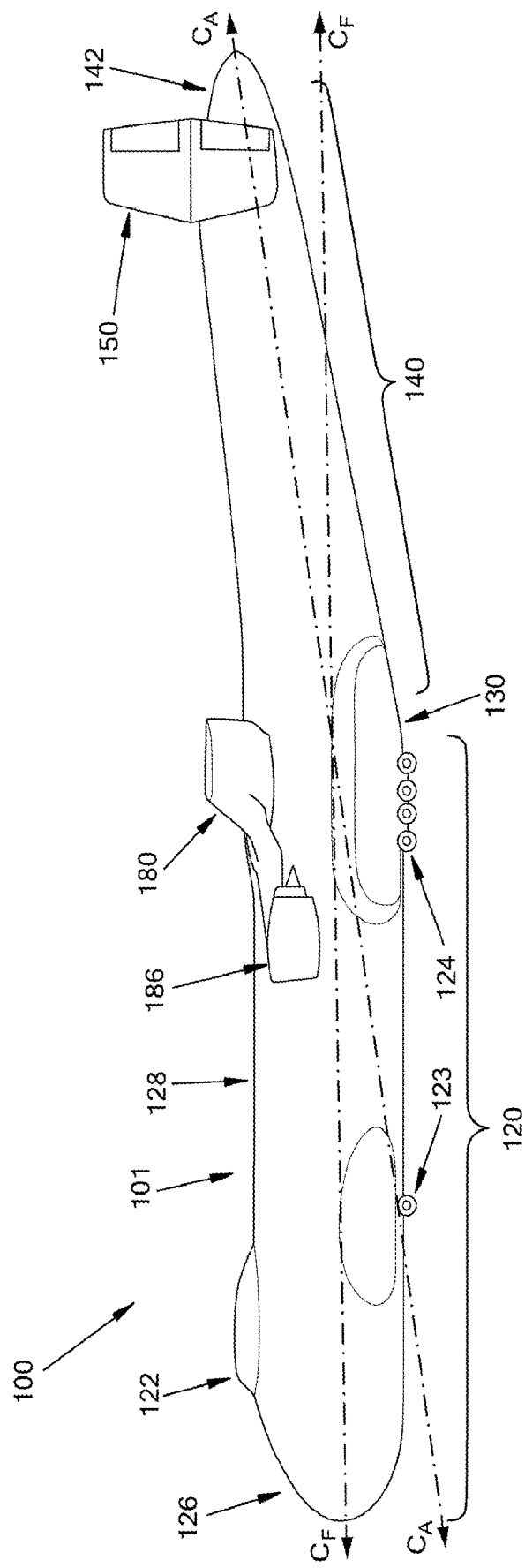
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2C and 6. In the illustrated embodiment, a payload 10 is a combination of two wind turbine blades 11A and 11B (FIGS. 2B and 2C), although a person skilled in the art will appreciate that other payloads are possible. Such payloads can include other numbers of wind turbine blades (e.g., one, two, three, four, etc., or segments of a single even larger blade), other components of wind turbines (e.g., tower segments, generator, hub, etc.), or other large structures and objects whether related to wind turbines or not. The present application can be used in conjunction with most any large payload-large for the present purposes being at least about 57 meters long, or at least about 60, 65, 75, 85, 90, 100, 110, or 120 meters long—or for smaller payloads if desired. Beyond wind turbines, the aircraft 100 can be used with most any size and shape payload, but has particular utility when it comes to large, often heavy and/or bulky and/or irregularly-shaped, payloads.

As shown, for example in FIGS. 1A, 1B, and 2A-2C, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130 is a section of the aircraft 130 in which both a top-most outer surface 102 and a bottom-most outer surface 103 of the fuselage 101 become angled, as illustrated by an aft centerline CA of the aft end 140 of the fuselage 101 with respect to a forward centerline CF of the forward end 120 of the fuselage 101.

The forward end 120 can include a cockpit or flight deck 122, as shown located at a top portion of the aircraft, thus providing more space for cargo, and landing gears, as shown a forward or nose landing gear 123 and a rear or main landing gear 124. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position.

The interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween. The interior cargo bay 170 can thus include the volume defined by nose cone 126 when closed, as well as the volume defined proximate to a fuselage tail cone 142 located at the aft end 140. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access, including but not limited to a door located in the aft end 140.

One advantage provided by the illustrated configuration is that by not including an aft door, the interior cargo bay 170 can be continuous, making it significantly easier to stow cargo in the aft end 140 all the way into the fuselage tail cone 142. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a. In some embodiments, the floor 172 can be configured in a manner akin to most floors of cargo bays known in the art. In some other embodiments, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. In order for a cargo aircraft 100 to have as large of a cargo bay 170 as possible, the bottom contact surface 172 can be, effectively, the inner-facing side of the exterior skin of the fuselage. In such an arrangement, the bottom contact surface 172 is not designed to carry significant of the weight of the payload. Instead, rails can be structurally integrated with the fuselage 101 to carry the weight of the payload. A traditional cargo bay floor can be provided using a plurality of cargo bay floor segments that removably attach to the rails and can be advanced into the cargo bay 170 to form a continuous flat cargo bay floor.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first and second fixed wings 182, extending substantially perpendicular to the fuselage 101. In the illustrated embodiment, two engines 186, one mounted to each wing 182, 184 are provided, and other locations for engines are possible, such as being mounted to the fuselage 101.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline CF of the forward end 120 of the aircraft 100. Notably, although the present disclosure generally describes the portions associated with the aft end 140 as being "aft," in some instances they may be referred to as part of a "kinked portion" or the like because the entirety of the aft end 140 is angled as a result of the kinked portion 130. Despite the angled nature of the aft end 140, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170.

Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components. The control surfaces and control system designs can be configured for deflecting opposing flight control components in a symmetric fashion to increase aircraft drag, while maintaining controllability, which, among other advantages, reduces the maximum runway length required by improving the aircraft's ability to stop after an engine failure during takeoff. Additional details of the control surface designs and use are provided in International Patent Application No. PCT/US2021/59540, entitled "AIRCRAFT FLIGHT CONTROL SYSTEMS THAT ACT SYMMETRICALLY TO CREATE AERODYNAMIC DRAG," and filed Nov. 16, 2021, and the content of which is incorporated by reference herein in its entirety.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80, 84, 90, 95, 100, 105, 107, 110, 115, or 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 to 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 to 13 meters, or about 8 to 11 meters. One non-limiting diameter of the fuselage 101 proximate to its midpoint can be about 9 meters. One non-limiting length of the wingspan 180 can be about 80 meters. A person skilled in the art will recognize these sizes and dimensions are based on a variety of factors, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other commonly-owned patent applications, are the result of very specific design solutions arrived at by way of engineering.

Payload Loading, Unloading, and Stowing

Figure 2A:
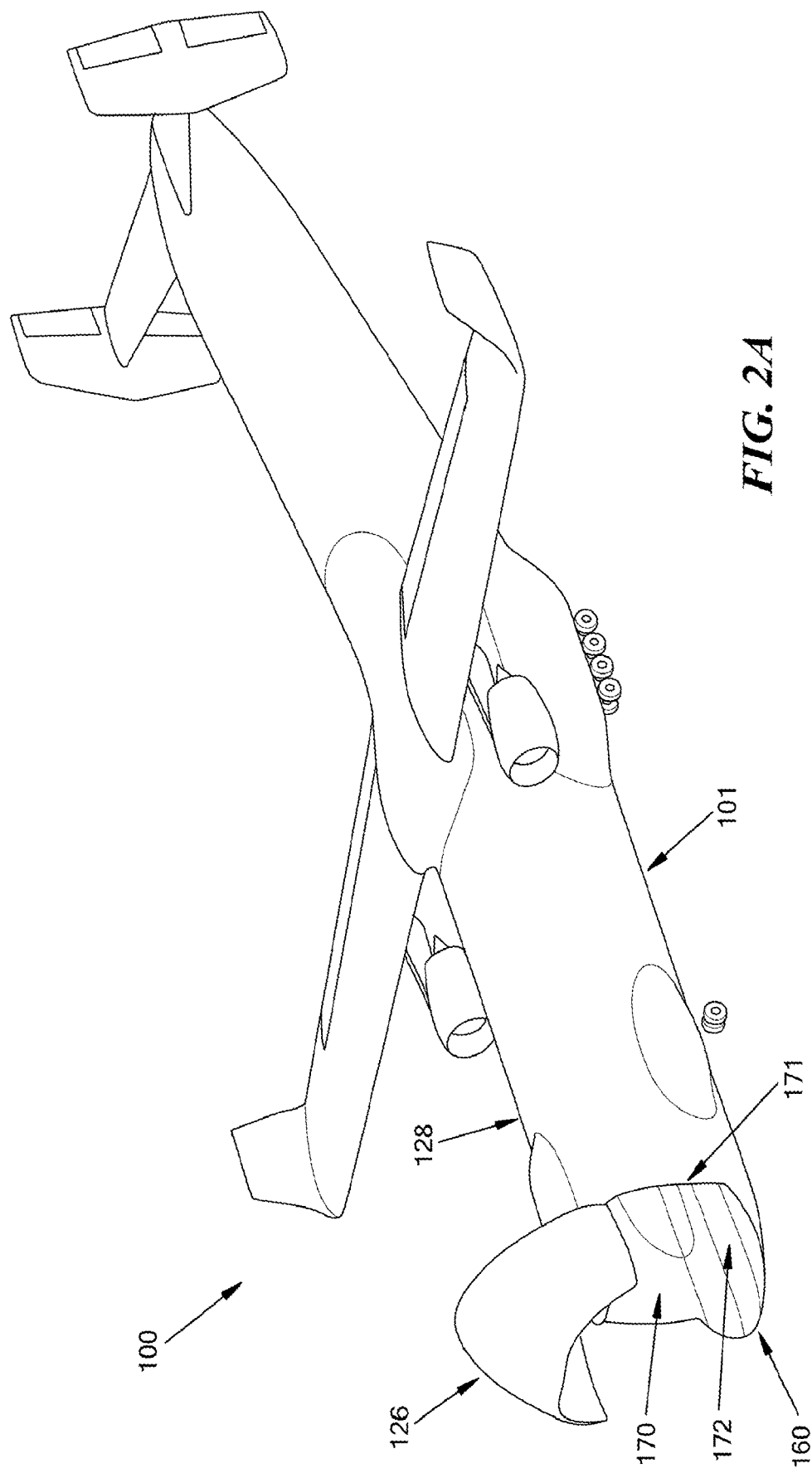
FIG. 2A is an isometric view of the aircraft of FIG. 1A with a nose cone door in an open position to provide access to an interior cargo bay of the aircraft.
Figure 2B:
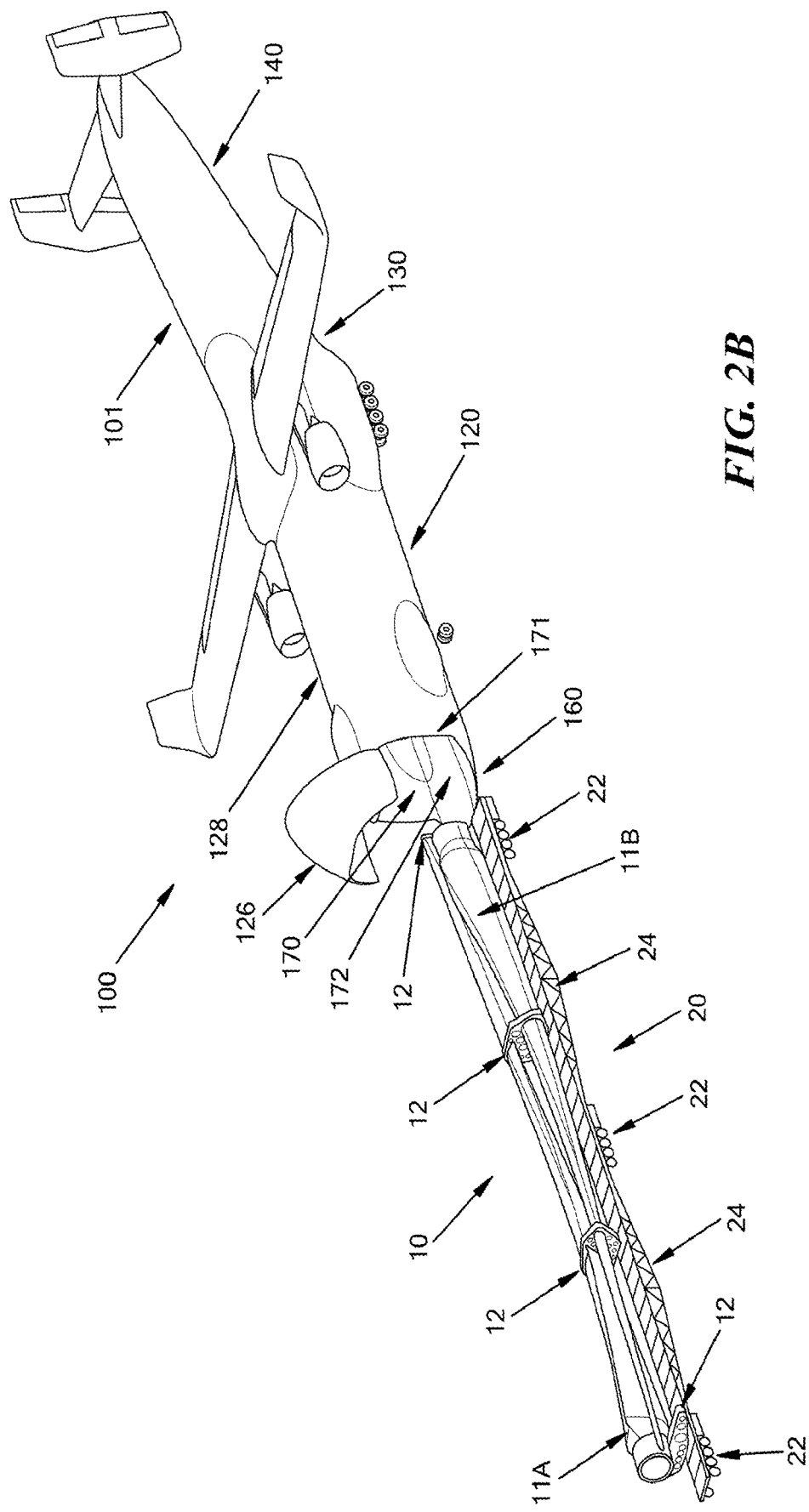
FIG. 2B is an isometric view of the aircraft of FIG. 2A with a payload being disposed proximate to the aircraft for loading into the interior cargo bay.
Figure 2C:
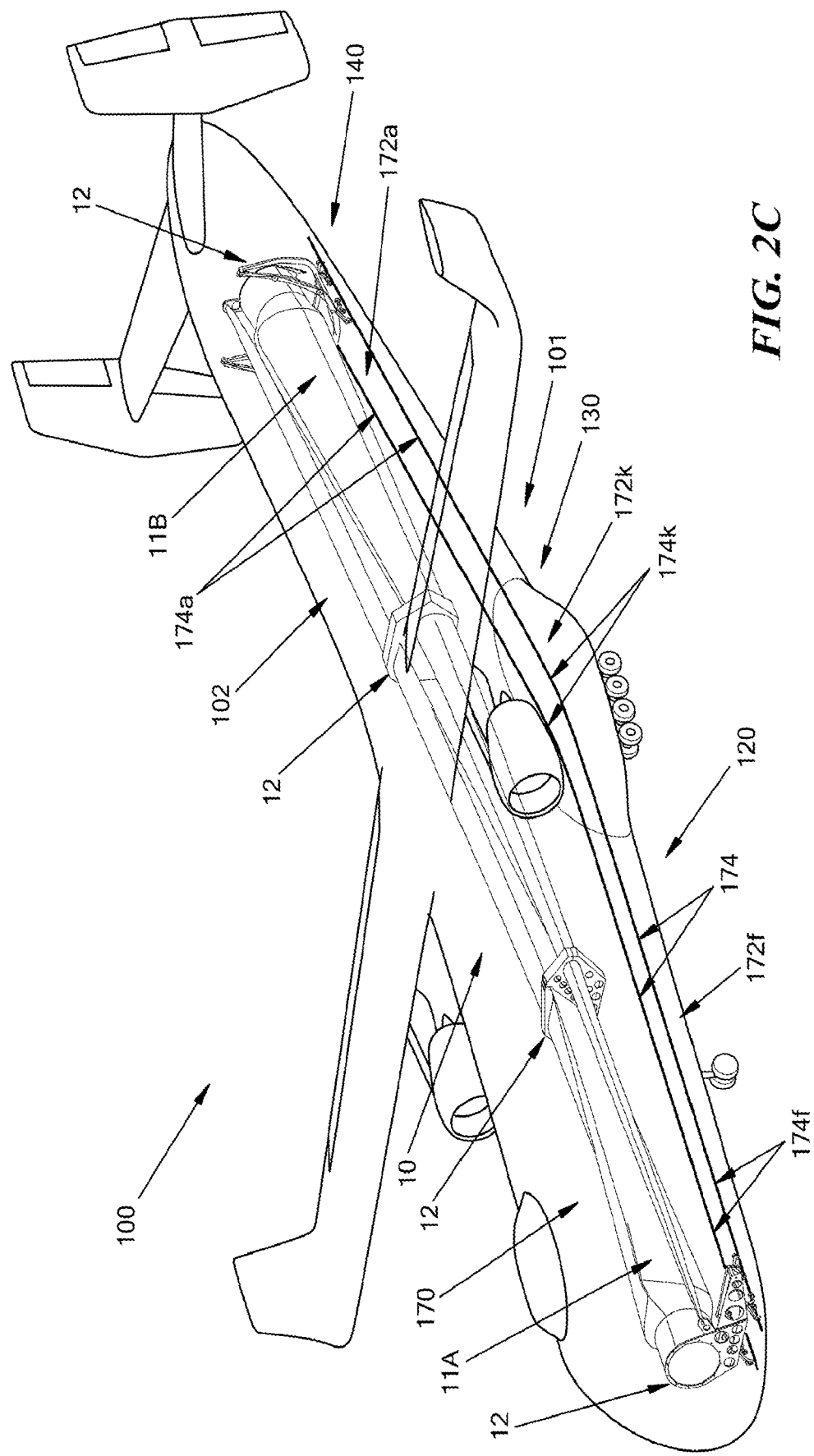
FIG. 2C is an isometric, transparent view of the aircraft of FIG. 1A having a payload disposed therein using a rail system.

FIGS. 2B and 2C provide for a general, simplified illustration of one exemplary embodiment of loading a large payload 10 into the aircraft 100. As shown, the cargo nose door 126 is open, exposing the interior cargo bay 170, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. The system and/or methods used to move the payload 10 into the cargo bay 170 can continue to be employed to move the payload 10 into the fully loaded position illustrated in FIG. 2C. FIG. 2C is a perspective view of the cargo aircraft 100 of FIG. 1A showing a pair of rails 174 coupled to, extending from, or otherwise associated with the bottom contact surface 172 of the cargo bay 170 that extends along the cargo bay 170 from a forward entrance to and through the aft section of the cargo bay 170 in the aft portion 140 (not visible) of the fuselage 101. The rails 174 can thus be configured to have a forward end 174$f$, a kinked portion 174$k$, and an aft end 174$a$. In some embodiments, the rail(s) 174 can serve as a primary structural member(s) or beam(s) of the fuselage 101, capable of bearing operational flight and/or ground loads, akin to a keel beam in some aircraft.

Additional details about tooling for cargo management, including rails and payload-receiving fixtures and fuselage configuration for enabling loading and unloading of payloads into aft regions of a continuous interior cargo bay are provided in International Patent Application No. PCT/US2020/049784, entitled "SYSTEMS AND METHODS FOR LOADING AND UNLOADING A CARGO AIRCRAFT," and filed Sep. 8, 2020, and the content of which is incorporated by reference herein in its entirety.

As a result of the unique nature of the kinked cargo bay configuration, new challenges arise when trying to load or unload large cargo into or out of the non-linear cargo bay. One solution involves systems and methods for loading and unloading the cargo along a curved path inside the fuselage. Examples include tooling and fixtures to enable moving a large cargo in a forward or aft direction while concurrently rotating the large cargo about a center point of an arc such that the large cargo moves along a curved or arc path in a forward or aft direction within the aircraft. Additional details are provided in International Patent Application No. PCT/US2021/21794, entitled "SYSTEMS AND METHODS FOR LOADING AND UNLOADING A CARGO AIRCRAFT UTILIZING A CURVED PATH," and filed Mar. 10, 2021, and the content of which is incorporated by reference herein in its entirety.

Kinked Fuselage

Figure 3:
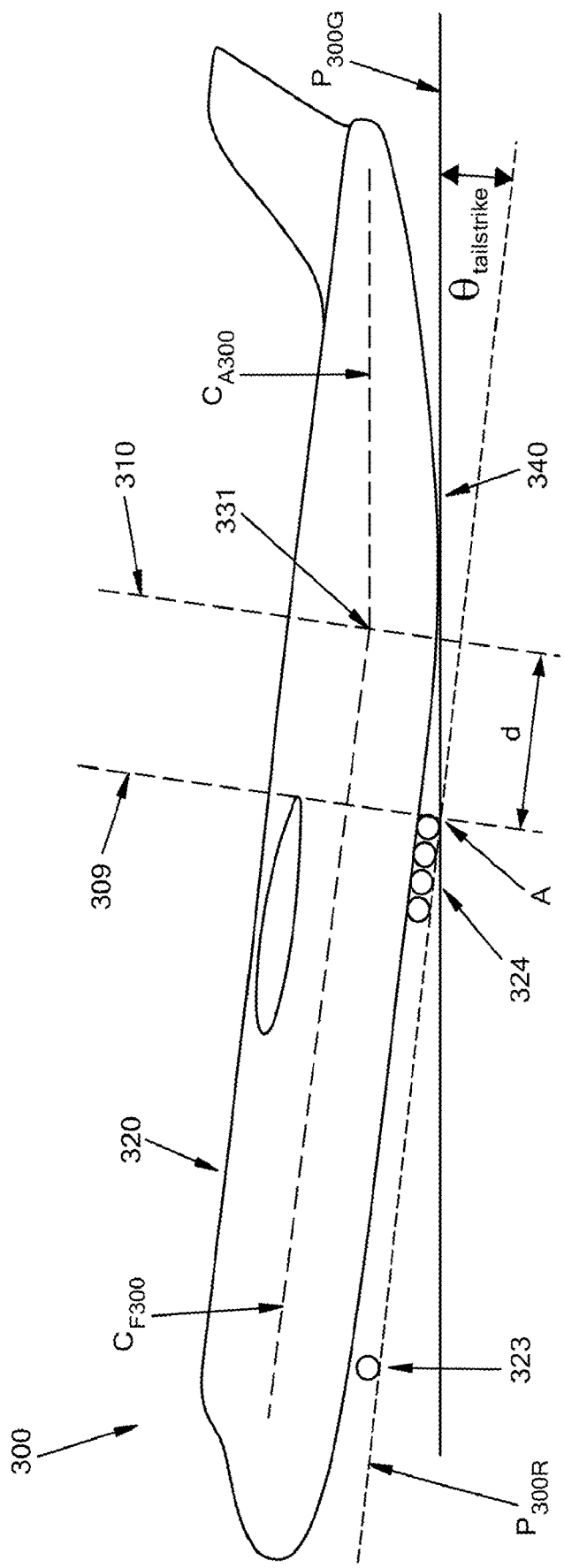
FIG. 3 is a schematic side view of an aircraft in the prior art, illustrating a lateral axis of rotation with respect to tail strike.

FIG. 3 is an illustration of a prior art aircraft 300 during a takeoff pitch-up maneuver showing the calculating of a tailstrike angle ($\theta_{tailstrike}$), which is determined when a forward end 320 of the aircraft 300 is lifted away from the ground $P_{300G}$ (e.g., a runway of an airport) and an aft end 340 and tail of the aircraft 300 is pushed towards the ground 50 until contact. This change occurs during a takeoff pitch-up maneuver when the aircraft 300 pitches (e.g., rotates) about a lateral axis of rotation, indicated as "A" in FIG. 3. This lateral axis of rotation, A, is typically defined by the main landing gear 324, which acts as a pivot point to allow a downwards force generated by the tail to lift the forward end 320 of the aircraft 300. In FIG. 3, the nose landing gear 323 and main landing gear 324 define a resting plane $P_{300R}$ (e.g., plane horizontal with the ground plane $P_{300G}$ when the aircraft is resting), such that the tailstrike angle $\theta_{tailstrike}$ can be defined by the change in the angle of the ground plane $P_{300G}$ with respect to the resting plane $P_{300R}$ when the aircraft 300 has achieved a maximal pitch angle or takeoff angle, which occurs just before any part of the aft end 340 of the aircraft 300 strikes the ground. In FIG. 3, a forward center line $C_{F300}$ of the aircraft 300 is shown, along with an aft centerline $C_{A300}$. In order to increase $\theta_{tailstrike}$, larger aircraft 300 usually have an upsweep to the lower surface of an aft region of the aft fuselage. This upsweep deflects the centerline $C_{A300}$ with respect to the forward center line $C_{F300}$ at the initiation of the upsweep, which is shown in FIG. 3 as a bend 331 in the centerlines $C_{F300}$, $C_{A300}$. In prior art aircraft 300, this bend 331 occurs a certain distance, shown in FIG. 3 as distance "d" aft of the lateral axis of rotation A. Longer values of distance "d" increase the constant cross-section length of the aircraft 300. Aspects of the present disclosure eschew this prior art incentive for increasing distance "d" and instead significantly reconfigure the relationship between the aft fuselage and forward fuselage such that decreasing distance "d" can result in increasing the maximum usable cargo bay length.

Figure 4:
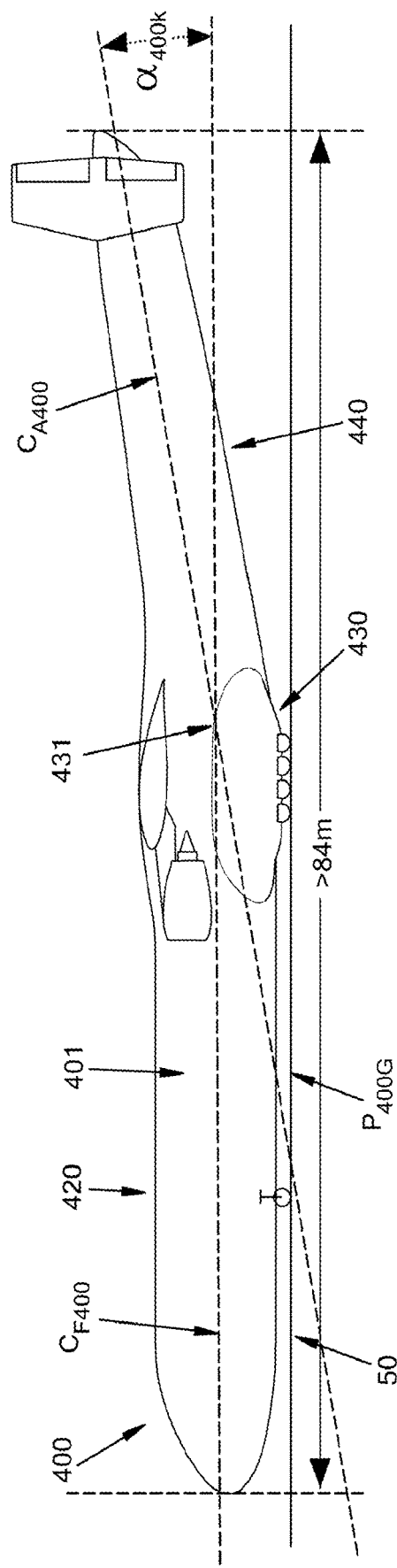
FIG. 4 is a side view of an alternative exemplary embodiment of an aircraft.

FIG. 4 is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle @$_{400K}$ of the aft fuselage 440. The kink location 431 is contained in the kinked portion 430 disposed between and connecting the forward and aft ends 420, 440.

Figure 5:
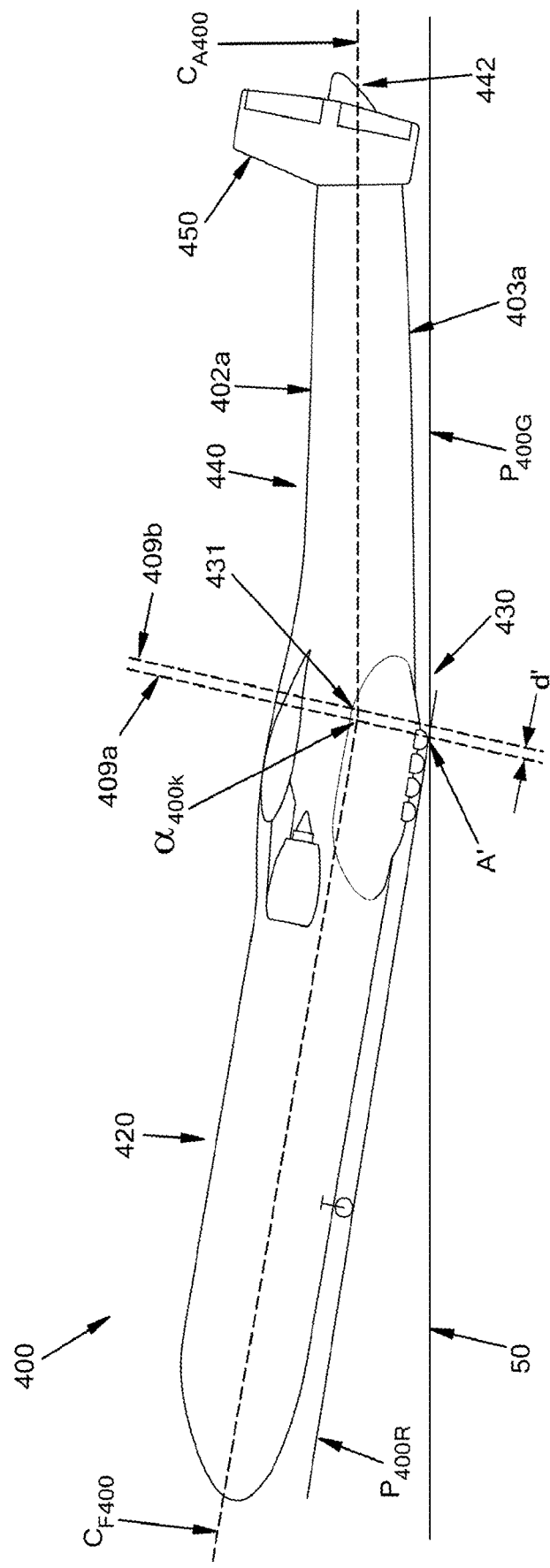
FIG. 5 is a side view of the aircraft of FIG. 4 in a take-off position.

In FIG. 5, the angle of the aft centerline $C_{A400}$ with respect to the forward centerline $C_{F400}$ defines a kink or bend angle (illustrated as @$_{400K}$ in FIG. 4), which can be approximately equal to average of an angle of the after upper surface 402$a$ and an angle of the lower surface 403$a$ with respect to the forward centerline $C_{F400}$. Further, the kink angle @400K can be approximately equal to a degree of maximal rotation of the aircraft during the takeoff operation. In FIG. 5, the cargo aircraft 400 is shown on the ground 50 and rotated about the lateral axis of rotation to illustrate, for example, a takeoff pitch-up maneuver. In FIG. 5, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403$a$ (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle @400K of the kink 431 is approximately the maximum safe angle of rotation of the aircraft 400 about the lateral axis of rotation A'.

FIG. 5 shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $@_{400K}$ of the kink 431 or a slightly larger angle, as shown, the aft end 440 is highly elongated without risking a tail strike. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. Vertically aligning the kink location 131 with the lateral pitch axis can enable the aft fuselage 140 to extend without decreasing $\theta_{tailstrike}$, which also can enable the useable portion of the interior cargo bay 170 to extend aft along a substantial portion of the aft fuselage 140. The present designs also enable the creation of extremely long aircraft designs capable of executing takeoff and landing operations with shorter runway lengths than previously possible.

Examples of the aircraft 100 also include complex fuselage changes (e.g., the forward-to-aft kink or bend angle in the fuselage and interior cargo bay centerline) occurring over multiple transverse frames and longitudinally continuous skin panels, thus reducing the overall structural complexity of the transition zone. Additional details about kinked fuselages for are provided in International Patent Application No. PCT/US21/21792, entitled "AIRCRAFT FUSELAGE CONFIGURATIONS FOR UPWARD DEFLECTION OF AFT FUSELAGE," and filed Mar. 10, 2021, and the content of which is incorporated by reference herein in its entirety.

Cargo Bay

Figure 6:
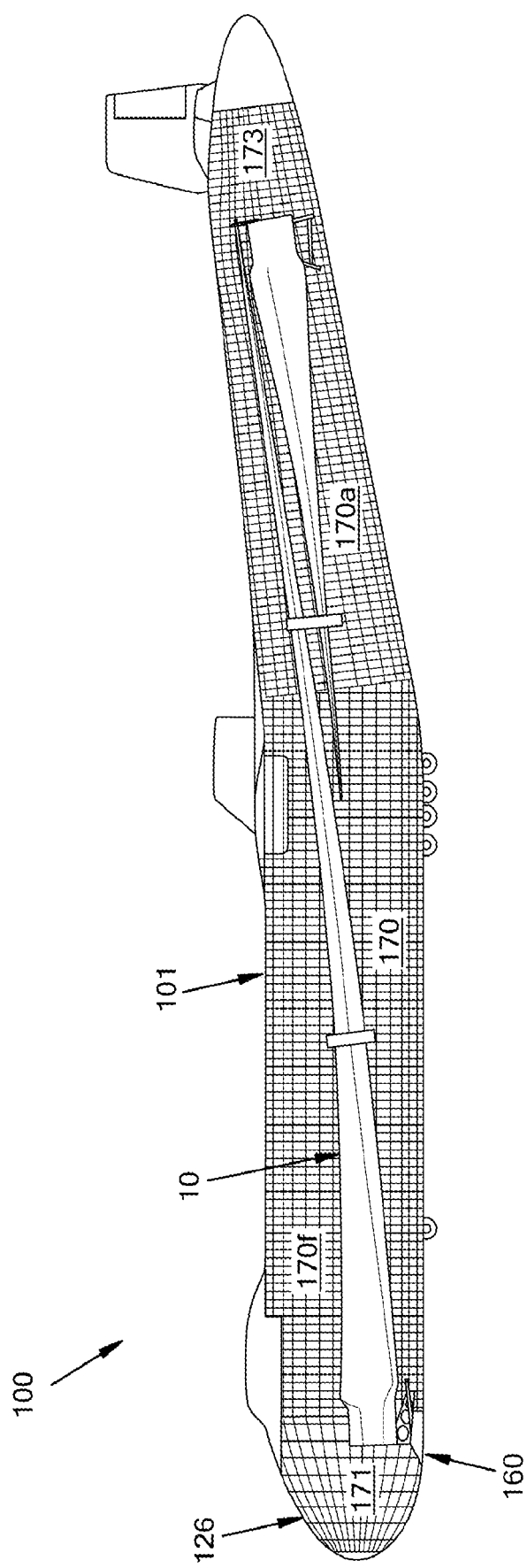
FIG. 6 is the side cross-sectional view of the aircraft of FIG. 6A with an exemplary payload disposed in the interior cargo bay.

FIG. 6 is side cross-section view of the cargo aircraft 100, the cross-section being taken along an approximate midline T-T of the top-most outer surface, as shown in FIG. 1A. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. FIG. 6 shows the aft region 170a of the cargo bay 170 extending through almost all of the aft fuselage 140, which is a distinct advantage of the configurations discussed herein. FIG. 6 shows a highly elongated payload 10 of two wind turbine blades 11A, 11B disposed substantially throughout the interior cargo bay 170 and extending from the forward end 171 of the forward region 170f to the aft end 173 of the aft region 170a. Examples of the present disclosure include a continuous interior cargo bay spanning more than a majority of a length of a fuselage of the aircraft from a forward end to an aft end and, in some instances, defining a maximum payload length approximately in the range of about 75 meters to about 125 meters. In some instances, the continuous interior cargo spans as much as 75%, 85%, 90%, or even up to 97% of the length of the fuselage. For the latest aircraft fuselage examples considered (e.g., over 400 feet long), even 98% is possible, especially if a replaceable tailcone is utilized to extend the cargo bay beyond a fixed portion of the fuselage.

Low-Density Cargo Aircraft Design Details and Performance

Figure 7A:
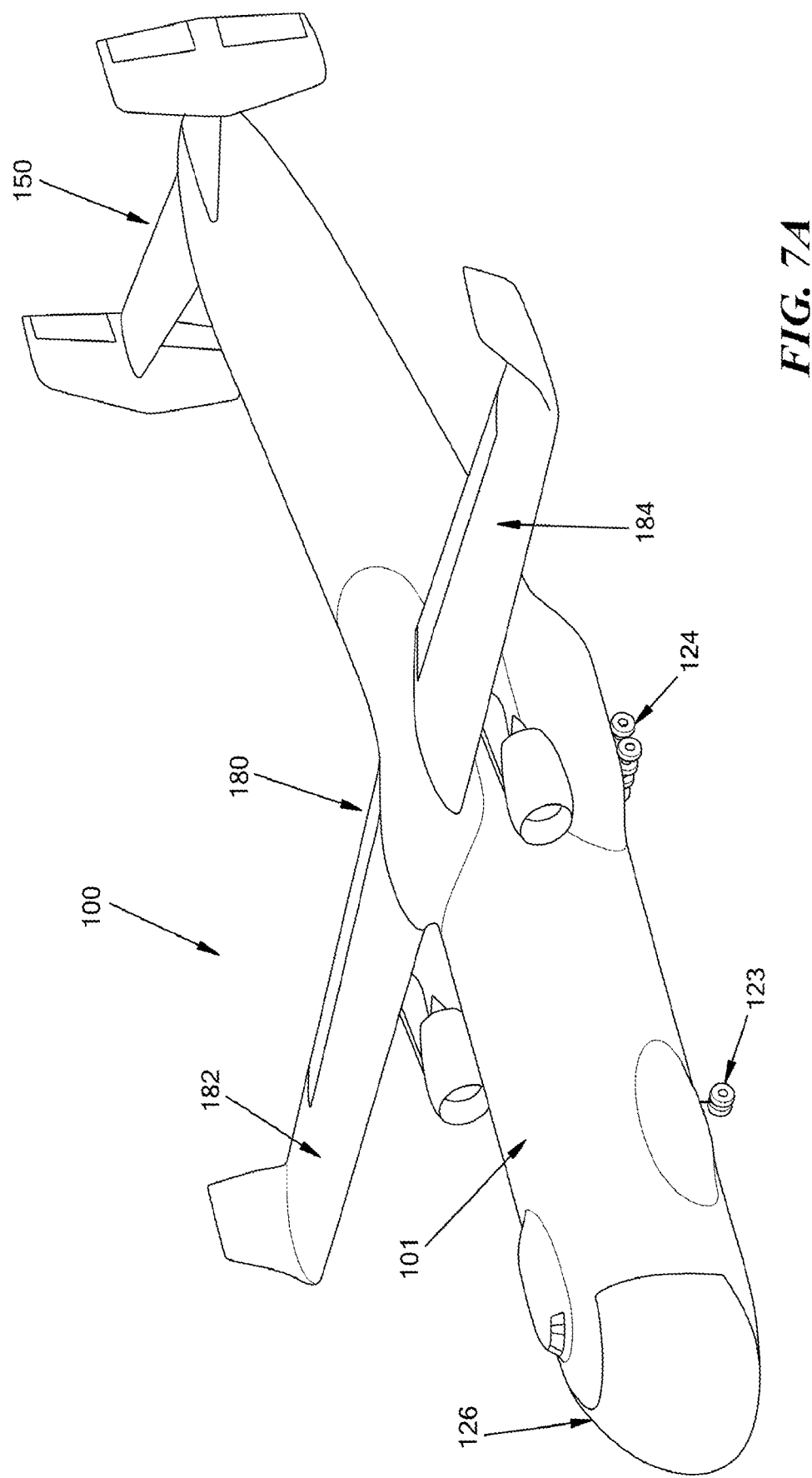
FIG. 7A is an illustration of the aircraft of FIG. 1A as non-limiting embodiment of an aircraft representative of a family of aircraft in the new design space.

A cargo aircraft embodiment of the present disclosure is illustrated in FIG. 7A, and this example cargo aircraft makes use of several design decisions to accommodate extremely large, low-density cargo, achieve short takeoff and landing (STOL) performance, and focus upon moderate airspeed and range. The aircraft 100 is primarily designed to carry a volumetrically large and long payload and do so with very short maximum takeoff distance. Very few, if any, aircraft have been designed in such a way, and no known designs can achieve the specific utility of the present design with respect to moving the largest wind turbine blades. Moreover, many specific design elements, some of which have never been utilized for their present purposes before (at least because no aircraft of this size has ever flown before and no cargo of this combination of volume and length has ever been moved by an aircraft design), such as a kinked fuselage, enable the substantial performance characteristics described herein.

Compared to examples of the present design, traditional cargo aircraft are designed to operate with payload densities that are substantially higher than necessary for moving wind turbine blades. As a result, traditional cargo aircraft are designed to takeoff, cruise, and land with relatively heavy payloads, even if those payloads are significantly smaller than those capable of being transported with the present design. For example, a typical 105 m fiberglass wind turbine blade weighs around 130,000 lbs, and a common large cargo aircraft, such as a Boeing 747-8F, can easily carry payloads more than twice this weight (e.g., ~300,000 lbs), yet the Boeing 747-8F has a cargo bay less than 185 ft long and only 24,462 ft$^3$ in volume. In order to carry such a dense payload (12.5 lbs/ft$^3$), the Boeing 747-8F has a maximum takeoff weight of almost 1,000,000 lbs. This overt cargo sizing dictates the takeoff performance of the aircraft, because the resultant wing loading, even with an empty cargo bay, is still sufficient to require a long runway to reach the necessary lift.

Existing large cargo aircraft are incapable of achieve STOL performance unassisted (e.g., without rocket boosters) at least because they are wholly designed for payload densities that prevent such performance with known techniques. Moreover, even if known techniques were applied to a hypothetical low density ultra-long payload cargo aircraft design, a number of critical unsolved problems present themselves (e.g., tailstrike) and prevent a functioning aircraft to be designed that achieves STOL performance. The cargo aircraft designs presented herein include solutions to the problems presented with scaling up existing cargo aircraft designs to achieve STOL performance with a low density ultra-long payload cargo aircraft.

The present disclosure provides an entirely different type of large cargo aircraft design, and not only because even the shortest of the the maximum cargo lengths disclosed are longer than most of the largest aircraft fuselages ever to fly, but also because the disclosed maximum payload densities (e.g., less than 1 lb/ft$^3$) are lower than any cargo aircraft design has ever contemplated—there are simply very few conceivable payloads of sufficient size and low weight to have warranted such a design to exist in the past. Very large wind turbine blades (e.g., over about 75 m) are exactly one such payload. However, even if such a payload is considered, existing large aircraft designs are incapable of being sized up to the scale necessary to transport wind turbine blades over about 75 m without requiring extremely long runways and/or other significant modifications well beyond what a person skilled in the art would consider routine and conventional in view of the complicated nature of resolving these problems while designing and building an aircraft. An entirely new approach to large aircraft design is required to transport extremely large, low density payloads, while also reducing takeoff runway length compared to existing large aircraft designs.

For the purposes of this disclosure STOL performance for this new class of ultra-large cargo is defined as takeoff field lengths of less than 2,500 ft. While there is no single accepted definition of STOL, common military definitions include the ability to clear a 50-foot obstacle within 1,500 feet of takeoff. The present 2,500 ft definition is used instead to account for the extreme fuselage lengths capable with examples of the present disclosure, which can be over 400 ft (i.e., a sizeable fraction of the runway length). Accordingly, and as detailed below, a new performance parameter is introduced: maximum takeoff distance in 'payloads,' that is, how many maximum payload lengths of runway are required for takeoff at maximum weight. Using this parameter, aircraft examples of the present disclosure achieve performance that is heretofore unheard with existing cargo aircraft: 9.0 payload lengths for 75 m payloads, and as low as less than 5.0 payload lengths for about 125 m payloads.

A number of individual design aspects contribute to the novel aircraft performance characteristics detailed herein. Any one of the following non-limiting and non-exhaustive list of relevant design aspects can contribute to the novel aircraft performance characteristics, and a combination of all of these can be found in the aircraft example of FIGS. 1A and 7A, as well as the design points detailed below: a kinked fuselage, an enclosed cargo bay, a bulbous nose with cantilevered cargo, a high cockpit position, a high tail position, only using trailing-edge high-lift elements on the main wings, an H-tail empennage, and/or an unswept and oversized wing. These design aspects and their use and contribution (alone or in combination) to the novel aircraft performance characteristics detailed herein, especially the kinked fuselage and kinked continuous interior cargo bay, results in an entirely new type of cargo aircraft design—an ultra-long, ultra-low density, short takeoff and landing aircraft that is capable of a specific utility (e.g., transporting the largest wind turbine blades to short inland airfields) that no modification of existing aircraft designs could achieve without one or more of these design aspects. Each design aspect and its contribution to the novel aircraft performance characteristics and utility is described in more detail below. A person skilled in the art, in view of the present disclosures, will appreciate that not each of these design points is required to achieve the performance characteristics detailed herein. Such a person, in view of the present disclosures, will be able to utilize one or more of these design points, alone or in combination, to achieve performance characteristics that differentiate aircraft of the present disclosure from any aircraft pre-dating this disclosure. The present disclosure enables a person skilled in the art to achieve these better performance characteristics by mixing and matching the various design points using their knowledge in the art.

Kinked fuselage: A kinked fuselage allows the examples of the present aircraft design space to grow in length while still completing takeoff rotation or landing flare maneuvers that shorten the required runway length to take off and land, respectively. Because the maximum achievable wing angle of attack when the aircraft is on the ground depends upon the aircraft's tail strike angle, the use of fuselage kink allows the aircraft to rotate to high angles of attack without striking the tail on the ground. Kinked fuselages enable design to simultaneously increase maximum cargo length and decrease take off field length. On a plot of payload length versus takeoff field length (see FIG. 16A), this moves design examples both rightwards (increasing payload length) and downwards (decreasing takeoff length). Further details regarding the kinked shape of the fuselage utilized to extend the continuous interior cargo bay without decreasing the maximum takeoff pitch maneuver (e.g., improving cargo bay length without reducing takeoff performance) can be found in International Patent Application No. PCT/US2020/049787, entitled "AIRCRAFT FUSELAGE CONFIGURATIONS FOR AVOIDING TAIL STRIKE WHILE ALLOWING LONG PAYLOADS," and filed Sep. 8, 2020, and the content of which is incorporated by reference herein in its entirety.

Enclosed cargo: While wind turbine components are configured to handle high wind loads, these are still an order of magnitude lower than air loads at typical aircraft airspeeds. Moreover, wind turbine blades are typically very flexible, relative to their size, and thus their shape and wind loads would become unpredictable if transported externally. Accordingly, enclosing all, or close to all, of the cargo bay is necessary for transporting wind turbine components to ensure they are not damaged and the aircraft characteristics are predictable. Additionally, wind turbine blades are not necessarily aerodynamic or streamlined, depending, at least in part, upon the orientation in which they are carried. Thus, enclosing these items in the aircraft cargo bay reduces overall drag and improves overall handling characteristics, further improving improved takeoff distances because ground roll acceleration is impacted by drag.

Bulbous nose with cantilevered cargo, and high cockpit position: A bulbous nose 126 and a cantilevered tongue 160 allows the payload to extend forwards significantly into the nose 126 and underneath the high cockpit. The bulbous nose, allowing cargo to extend out into the nose section of the interior cargo bay 170, maximizes the length of payload per the length of the aircraft 100. Because aircraft length is a primary driver for weight and drag, lowering the aircraft weight and drag for the same cargo improves takeoff distances, because ground roll acceleration is impacted by drag and weight. Additionally, as aircraft grow in size, it is increasingly difficult to design them in a way that retains the ability to operate into a large number of existing airports; minimizing the overall vehicle size and dimensions while retaining the ability to carry the same large cargo is important. On a plot of fuselage length versus payload length (see FIG. 14A), this moves us upwards and leftwards (e.g., increasing payload length for a given fuselage length). Additional details of the cantilevered tongue system are provided in International Patent Application No. PCT/US2020/4985, entitled "VOLUMETRICALLY EFFICIENT CARGO AIRCRAFT," and filed Sep. 8, 2020, and the content of which is incorporated by reference herein in its entirety.

High tail position: A high tail position, specifically one that allows the interior cargo bay 170 to extend out into the tail cone section below the empennage 150, maximizes the length of payload per the length of the aircraft 100. Aircraft fuselage length is a primary driver for weight and drag, and lowering the vehicle weight and drag for the same cargo improves takeoff distances, because ground roll acceleration is impacted by drag and weight. Additionally, as aircraft size increases, it is increasingly difficult to design the aircraft in a way which retains the ability to operate into a large number of existing airports. Accordingly, minimizing the overall aircraft size and dimensions while retaining the ability to carry the same large cargo is important. On a plot of fuselage length versus payload length (see FIG. 14A), this moves us upwards and leftwards. Additional details about extending the cargo bay into tailcone are provided in International Patent Application No. PCT/US2021/16366, entitled "DEVICES AND METHODS FOR EXTENDING AIRCRAFT CARGO BAYS WITH REPLACEMENT TAILCONES," and filed Feb. 3, 2021, and the content of which is incorporated by reference herein in its entirety.

Trailing-edge flaps only: Typical large cargo aircraft use leading-edge devices on their main wings for increasing lift, such as slats and slots, but these increase the angle of attack (AOA) at maximum lift while trailing-edge flaps decrease the AOA at maximum lift. Examples of the present disclose include aircraft that are designed to only flare on landing or rotate on takeoff as high as the tailstrike angle, which can be a function of the kinked fuselage. Examples of the present disclosure include cargo aircraft designs utilizing trailing-edge high-lift elements such as flaps only, rather than also adding leading-edge high-lift elements such as slots or slats, because the extreme fuselage lengths dictate that the aircraft design is likely to be a geometry-limited aircraft regardless of extending a hypothetical lift curve beyond the tailstrike limit of the aircraft's angle of attack. This avoids the cost, complexity, and weight of leading edge elements, all of which are undesirable for an aircraft. Aspects of the present disclosure include primary wings without leading-edge lifting devices.

H-tail empennage design: The H-tail design achieves higher vertical tail aspect ratio for the same vertical area between the aircraft height limit and the rotated tail strike plane. Accordingly, the use of an H-tail shortens the span of the vertical tail while not sacrificing vertical tail effectiveness. The lift slope of the vertical tail is directly related to the effective aspect ratio, which is the ratio of the square of the individual surfaces' spans to the individual surfaces' areas. Additionally, as the aircraft size increases, is increasingly difficult to design the aircraft to retain the ability to operate into a large number of existing airports. Accordingly, minimizing the overall vehicle size and dimensions while retaining the ability to carry the same large cargo is important.

Unswept, oversized wing: An oversized wing with zero sweep angle as measured at the quarter-chord location enables very good aircraft handling characteristics and performance at low STOL speeds. Unswept wings are almost entirely absent from known large cargo aircraft designs, and embodiments of the present invention utilize an unswept wing. Most modern cargo freighter aircraft focus heavily upon extremely efficient flight at high speeds where the Mach number is significantly into the compressible transonic range. This focus, however, requires wing sweep to avoid strong shockwaves from creating massive drag increases, as well as stability and controls problems. Examples of the present disclosure also include the use of an oversized wing. When used together, unswept and oversized wings improve STOL performance, but significantly increases cruise drag, thus reducing speed and fuel efficiency. However, this tradeoff is acceptable in order to obtain a takeoff field length that is sufficiently low to enable the operation of the aircraft 100 at runways built at wind farm locations for the purpose of facilitating the delivery of wind turbine components via aircraft. One skilled in the art will appreciate that 'unswept' does not explicitly refer to only exactly zero sweep angle. Instead, unswept wings refers to wings with so little to no sweep, for example, +/−10 degrees of average sweep along the wing's quarter-chord.

In addition, all of the following advantageous features are also present in the embodiment in FIGS. 1A and 7A:

(1) Aircraft 100 wingspan 180 is geometrically limited to comply with International Civil Aviation Organization (ICAO) Group 6 limits (80 meters).

(2) Aircraft 100 height is geometrically limited to comply with ICAO Group 6 limits (24.4 meters).

(3) Aircraft 100 wing 182, 184 area is balanced between being large for performance (e.g., low wing loading and STOL performance) and not creating too much lift-related induced drag due to a low geometric aspect ratio, which is effectively increased by using a winglet.

(4) Aircraft 100 wing 182, 184 is unswept and maintains a relatively large thickness ratio and leading edge radius, for good low-speed performance and handling characteristics; the penalties (e.g., lower Mach number at drag divergence and shock formation/slightly higher drag) are tolerable due to the resultant moderate maximum operating speed and moderate range being compatible with the operational requirements of the aircraft (e.g., delivering wind turbine blades from port locations directly to inland windfarm locations). The moderate air range aligns with the statistically common delivery distances between wind turbine component factories and wind turbine farm sites, while the moderate air speed aligns with rapid development and certification but can still achieve multiple missions per day of the likely required air range.

(5) Aircraft 100 utilizes trailing edge high-lift devices, which offer an increase in maximum lift for STOL performance, but at low stall angles to avoid tailstrike on the inherently long aft fuselage 101.

(6) A high-wing configuration maintains significant ground height for sensitive lifting surfaces and engines vulnerable to foreign-object-damage (FOD) to allow operations on semi-prepared fields that do not need to be fully paved.

(7) Landing gear 124 are pushed outboards of the interior cargo bay 170, and the wing 182, 184 is pushed upwards from the intersecting fuselage 101, thus creating as much room as possible for a continuous interior cargo bay 170.

(8) The H-tail empennage 150 configuration maximizes room for vertical stabilizer area and aspect ratio.

(9) The main landing gear 124 is aligned laterally to reduce the overlap between nose landing gear 123 and the main landing gear 124 during ground roll, to increase support by spreading the aircraft weight over more gear during takeoff and landing, and to reduce takeoff rotation forces required due to a reduced distance between vehicle center-of-gravity (CG) position and landing gear rotation axis.

Designing Cargo Aircraft Based on Wind Turbine Blade Length

Using some or all of the above design features, examples of the present disclosure include aircraft designs based on a maximum wind turbine payload length, as well as other related payload geometries and characteristics related to the transport of wind turbine blades. First, a representative maximum wind turbine blade payload is determined and, second, an interior cargo bay is sized to carry, load, and unload the payload. Finally, aspects of the present aircraft design embodiments are used to design a fixed-wind low-density cargo aircraft capable of short takeoffs and landings.

Figure 9:
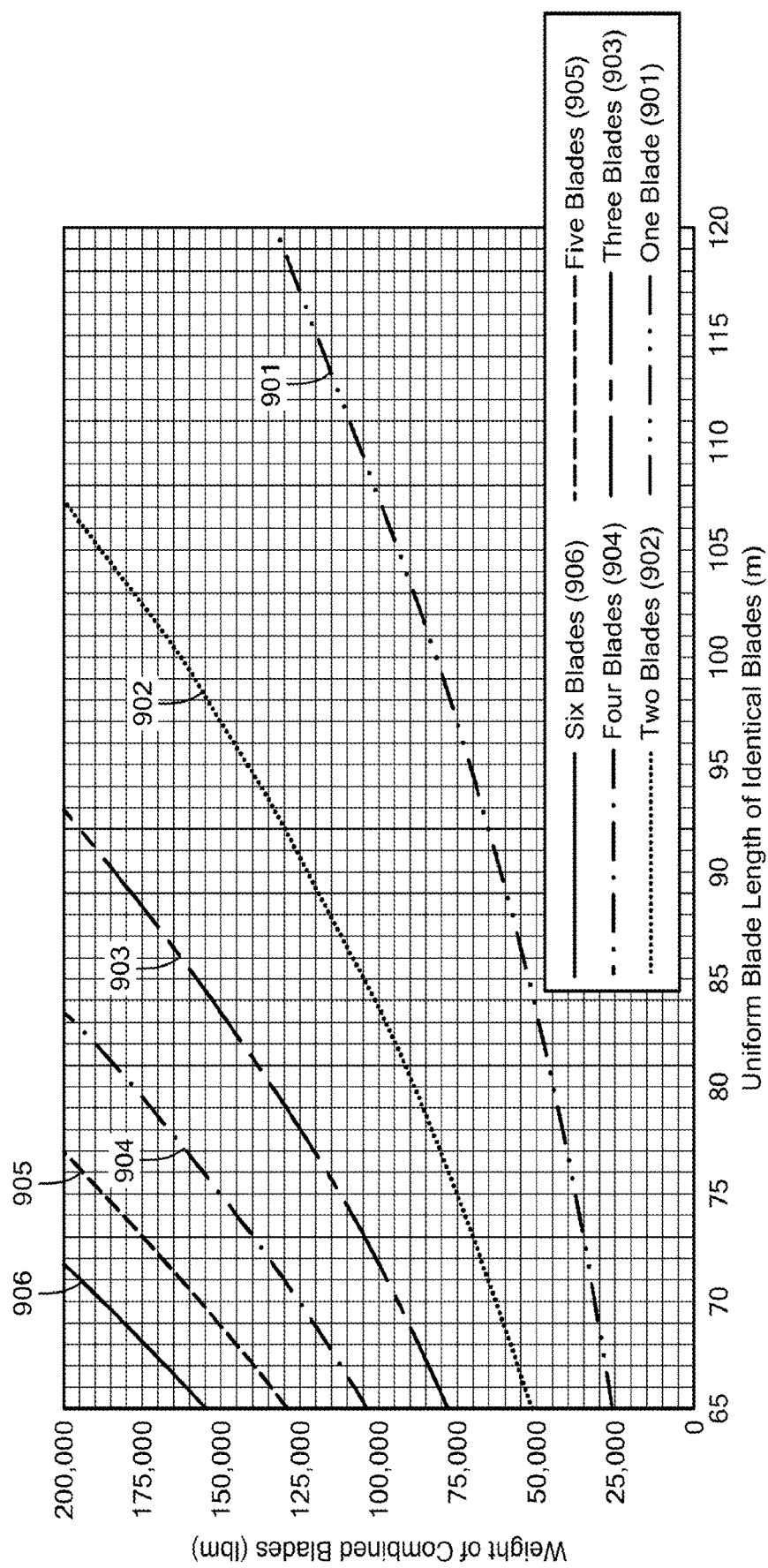
FIG. 9 is a graph of typical wind turbine blade length versus mass based on existing wind turbine blades.

The information pertaining to the various cargo aircraft designs in the cargo aircraft family from this disclosure are determined as follows. Payload can be determined using a wind turbine blade model, such as the model captured in FIG. 9. In FIG. 9, wind turbine blade payload shapes were determined for a variety of payloads using market research, paid external consultants at leading wind industry component design companies, and an in-house parametric wind turbine blade model, additional details of which can be found in International Patent Application No. PCT/US2020/049781, entitled "SYSTEMS AND METHODS FOR OPTIMIZATION OF PACKAGING LARGE IRREGULAR PAYLOADS FOR SHIPMENT BY AIR VEHICLES," and filed Sep. 8, 2020, and the content of which is incorporated by reference herein in its entirety.

Payload orientations can be created using a process to package large, irregular shapes together. Further details regarding optimization methods used to determine arrangement of wind turbine blades and the associated sizing of the cargo bay to carry a representative plurality of expected wind turbine blade packages can also be found in the aforementioned International Patent Application No. PCT/US2020/049781.

A keepout zone can be determined for all payload orientations by taking their union and adding an assortment of margins and clearances using another process cargo bay sizing process, further details of which can be found in International Patent Application No. PCT/US2020/061883, entitled "SYSTEMS AND METHODS FOR HOMOGENEOUS CARGO OR PAYLOAD SPACE RESERVATION WITH HETEROGENEOUS CARGOS AND PAYLOADS," and filed Nov. 23, 2020, and the content of which is incorporated by reference herein in its entirety.

For the example aircraft data points disclosed herein, aircraft loads, and other aerodynamics data on the configurations such as lift, drag, and pitching moment, were determined using computational fluid dynamics (CFD) output data and validated by wind tunnel testing for one of the design points. Structural sizing and corresponding weights were determined using global aircraft finite element modeling (FEM). Geometric information (e.g., fuselage length, cargo bay length, and cargo bay volume) was calculated from outer mold line (OML) models in computer aided design (CAD) software.

Finally, all information was fed into a reduced three (3) degree-of-freedom (DOF) performance physics simulation, which integrates vehicle states through time from an initial state. This simulation includes using parameters such as weight, lift, thrust, drag, position, acceleration, speed, altitude, temperature, and/or aircraft orientation to produce performance quantities such as takeoff field length. These steps are considered standard practice for modern large aircraft design and are not discussed further because they are routine for one of ordinary skill in the art.

Figure 7B:
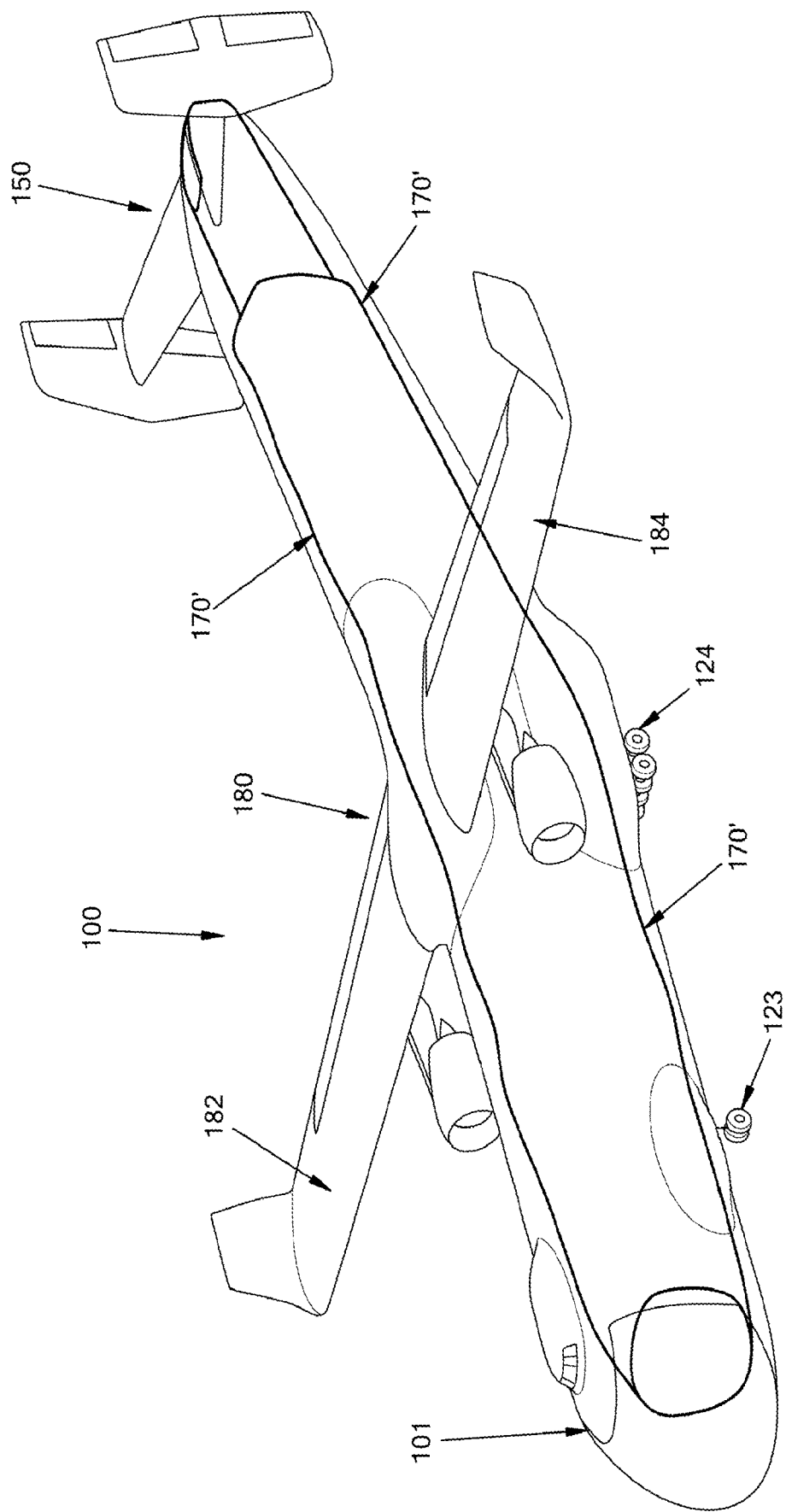
FIG. 7B is an illustration of a single continuous cargo volume shown inside the cargo bay of the aircraft of FIG. 7A.

FIG. 7B is an illustration of the result of the sizing methods discussed herein. In FIG. 7B, the aircraft 100 of FIGS. 1A and 7A is shown translucent and a single continuous cargo volume (solid) 170' represents a cargo volume that maximally occupies the full useable amount of interior fuselage space within the aircraft 100 (e.g., the volume around which the interior walls of the interior cargo bay 170 are placed). The continuous cargo volume 170' was sized and shaped according to the methods disclosed herein, and used, as an initial design constraint, a payload volume sized and shaped using one or more wind turbine blade geometries.

Figure 8:
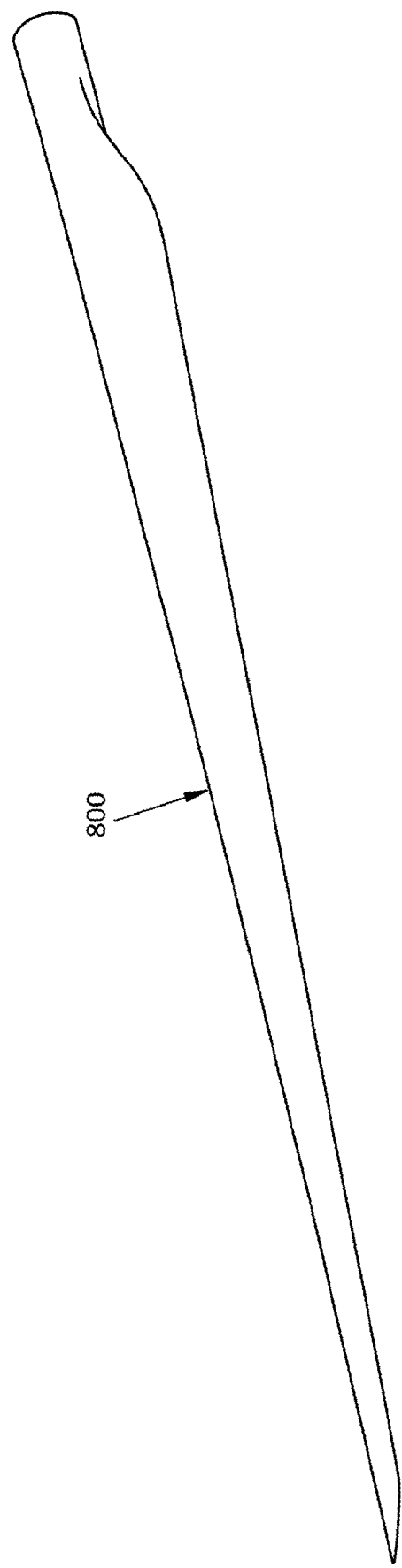
FIG. 8 is an illustration of an example of a 100 meter wind turbine blade geometry.

FIG. 8 is an illustration of an example of a very large scale (~100 meter) wind turbine blade geometry from a leading wind turbine blade design company. FIG. 8 is an example wind turbine blade geometry 800 that can be used to determine an initial design constraint. FIG. 8 illustrates a typical wind turbine blade, which is a complex, compound-curvature surface that varies in many parameters along its length, but might be represented approximately as a tapering cylinder where the cylindrical blade root diameter is approximately 5% of the blade length and the blade tip cross-section tapers linearly down to approximately 50% of the blade root cross section. Other representations are possible.

FIG. 9 illustrates a typical payload mass for a group of wind turbine blades (where the combined total payload is either a single one blade 901, or a group of two blades 902, three blades 903, four blades 904, five blades 905, or six blades 906) which might be transported by the aircraft 100 during a single mission. The data of FIG. 9 is compiled from market surveys, leading wind turbine design company consultation, and published research data, and illustrates a representative model relating the payload mass of a group of identical wind turbine blades to the payload volume of those blades. Blade lengths below 70 meters are primarily composed of fiberglass, but the blades captured by this model assume a transition to a mild carbon fiber content fraction as the blade lengths grow, as is representative of the state of the art at this in wind turbine blade design.

Figure 10:
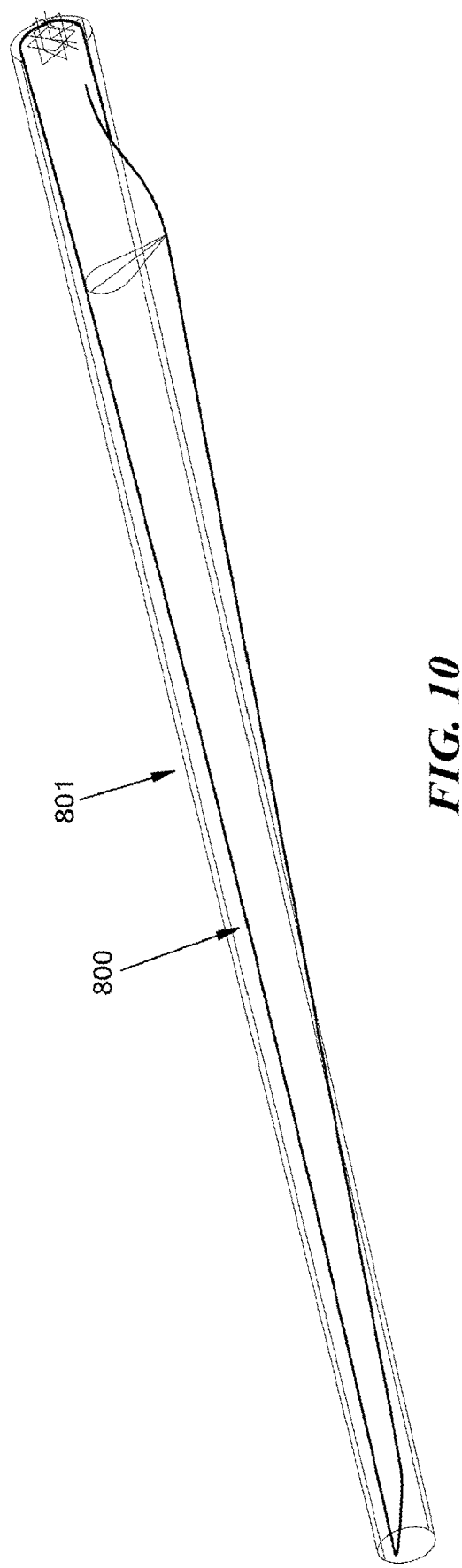
FIG. 10 is an illustration of the wind turbine blade of FIG. 8 inside a transparent tapering conical volume model that is used as a representative payload shape for the algebraic comparisons herein.

FIG. 10 is an illustration of the wind turbine blade geometry 800 of FIG. 8 with a simplified tapering conical volume model 801 (transparent), which can be as a representative payload shape to simplify the algebraic comparisons in the discussions herein.

Table 1 contains a plurality of example wind turbine payloads, including payloads of single blades and dual blades. Payloads including three or more blades are possible as well. Each payload design point represents a maximum length payload for use in sizing the cargo bay of the aircraft design examples detailed herein. In Table 1, the "A" design points represent a 75 meter maximum single blade payload length as well as a dual-blade payload comprising two 68 meter wind turbine blades. Design points A1 (and all of the "1" points) is for the single and dual blades constructed using fiberglass and design point A2 (and all of the "2" points) is for the same single and dual blade geometries as point A1, but constructed using carbon fiber. Each payload design point results in a corresponding aircraft design point (discussed in more detail below) that is able to load, unload, and transport a cargo within the size and weight of the corresponding payload design point while achieving STOL performance characteristics.

TABLE 1

Design points for cargo aircraft embodiments carrying single or dual wind turbine blade payloads

| Design Point (none) | 100% Blade Material (none) | Blade Material Weight Factor (%) | Maximum Single Blade Length (meters) | Single Blade Root Diameter (meters) | Single Blade Max. Chord (meters) | Single Blade Weight (lbm) | Maximum Dual Blade Length (meters) | Dual Blade Root Diameter (meters) | Dual Blade Max. Chord (meters) | Dual Blade Total Weight (lbm) |
|---|---|---|---|---|---|---|---|---|---|---|
| A1 | Fiberglass | 100.0% | 75 | 3.00 | 4.95 | 56,472 | 68 | 2.72 | 4.49 | 86,766 |
| A2 | Carbon Fiber | 76.6% | 75 | 3.00 | 4.95 | 43,273 | 68 | 2.72 | 4.49 | 66,488 |

TABLE 1-continued

Design points for cargo aircraft embodiments carrying single or dual wind turbine blade payloads

| Design Point (none) | 100% Blade Material (none) | Blade Material Weight Factor (%) | Maximum Single Blade Length (meters) | Single Blade Root Diameter (meters) | Single Blade Max. Chord (meters) | Single Blade Weight (lbm) | Maximum Dual Blade Length (meters) | Dual Blade Root Diameter (meters) | Dual Blade Max. Chord (meters) | Dual Blade Total Weight (lbm) |
|---|---|---|---|---|---|---|---|---|---|---|
| B1 | Fiberglass | 100.0% | 85 | 3.40 | 5.61 | 77,962 | 77 | 3.08 | 5.08 | 121,014 |
| B2 | Carbon Fiber | 76.6% | 85 | 3.40 | 5.61 | 59,741 | 77 | 3.08 | 5.08 | 92,731 |
| C1 | Fiberglass | 100.0% | 95 | 3.80 | 6.27 | 102,736 | 86 | 3.44 | 5.68 | 160,582 |
| C2 | Carbon Fiber | 76.6% | 95 | 3.80 | 6.27 | 78,725 | 86 | 3.44 | 5.68 | 123,052 |
| D1 | Fiberglass | 100.0% | 105 | 4.20 | 6.93 | 130,796 | 95 | 3.80 | 6.27 | 205,473 |
| D2 | Carbon Fiber | 76.6% | 10 | 4.20 | 6.93 | 100,227 | 95 | 3.80 | 6.27 | 157,450 |
| E1 | Fiberglass | 100.0% | 115 | 4.60 | 7.59 | 162,140 | 104 | 4.16 | 6.86 | 255,684 |
| E2 | Carbon Fiber | 76.6% | 115 | 4.60 | 7.59 | 124,245 | 104 | 4.16 | 6.86 | 195,926 |
| F1 | Fiberglass | 100.0% | 125 | 5.00 | 8.25 | 196,769 | 113 | 4.52 | 7.46 | 311,217 |
| F2 | Carbon Fiber | 76.6% | 125 | 5.00 | 8.25 | 150,781 | 113 | 4.52 | 7.46 | 238,480 |

Figure 11:
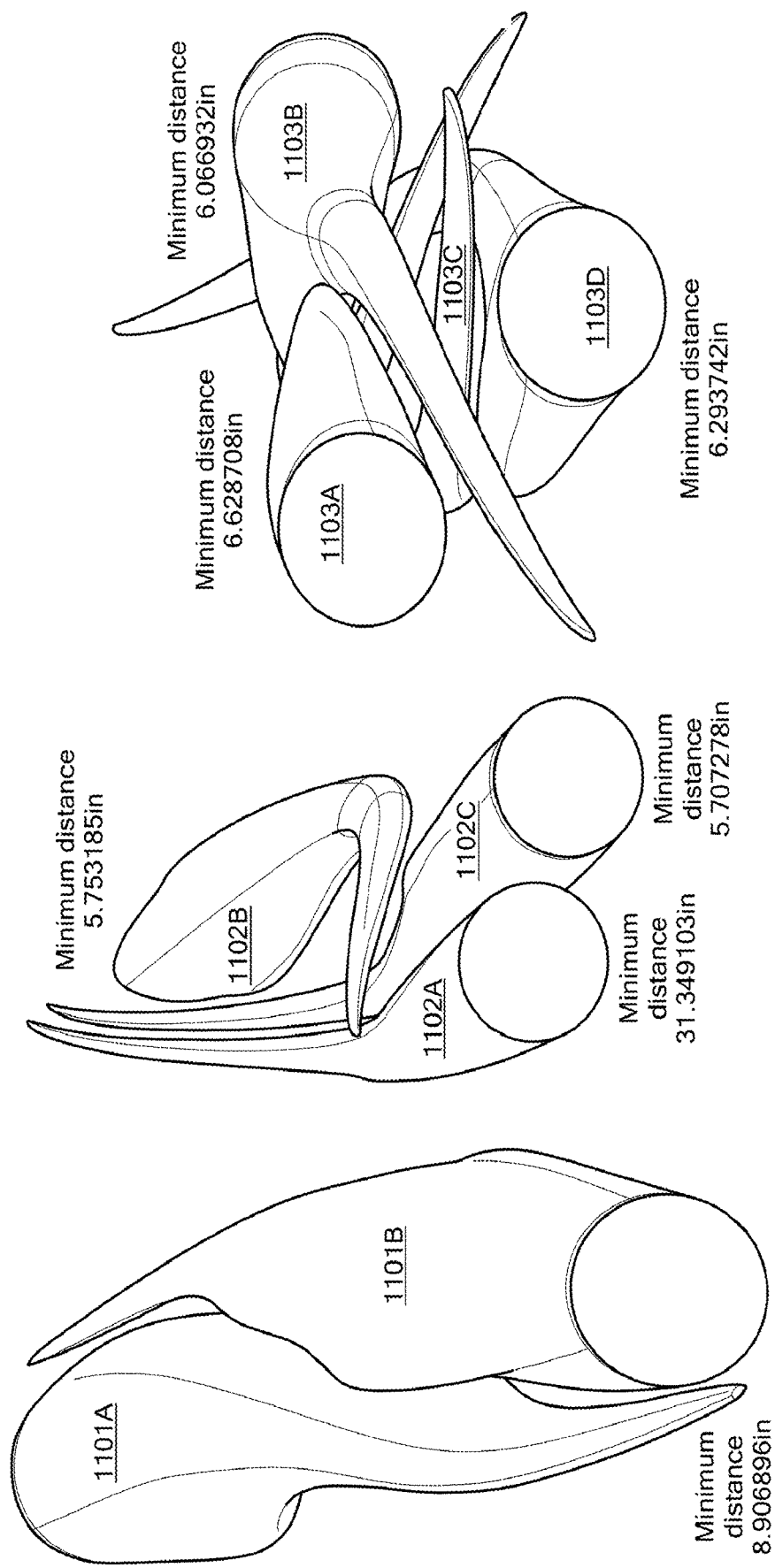
FIG. 11A-11C are three illustration of wind turbine blade packaging arrangements for two, three, and four blades, respectively.
Figure 12:
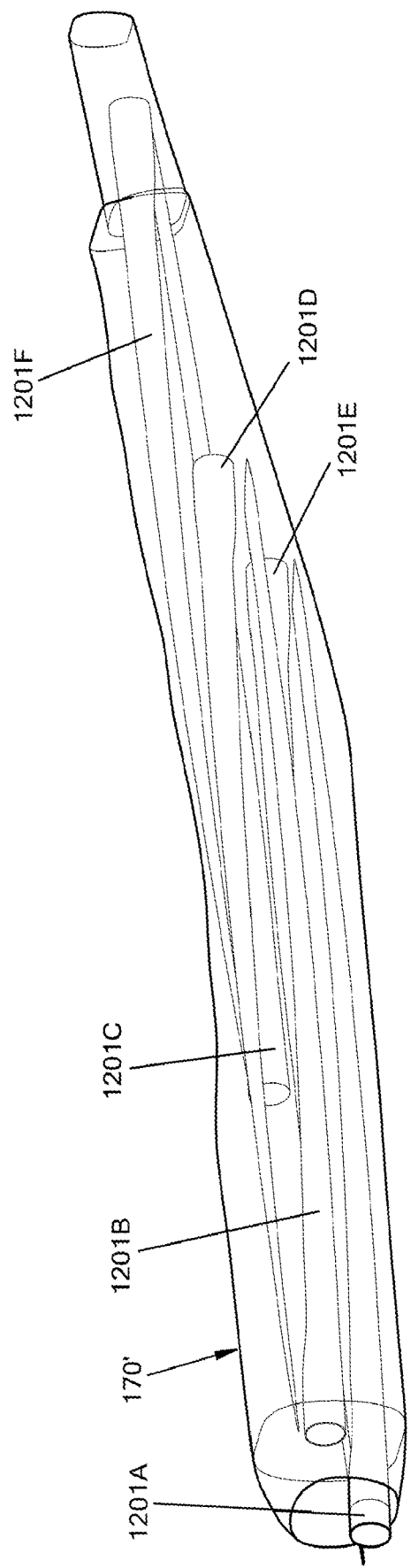
FIG. 12 is an illustration of a sample blade packaging for six blades shown in the single continuous cargo volume of FIG. 7B.

FIGS. 11A-11C are three illustrations of sample blade packaging arrangements for different numbers of blades. FIG. 11A shows a payload of two wind turbine blades 1101A, 1101B, FIG. 11B shows a payload configuration of three wind turbine blades 1102A-1102C, and FIG. 11C shows a payload configuration of four wind turbine blades 1103A-1103D. As mentioned, any number of wind turbine blades can be used as a sizing design point. For example, an example payload of six wind turbine blades 1201A-1201F with a total payload length of approximately 100 meters is shown in FIG. 12 contained in the representative cargo volume 170' of FIG. 7B.

For payloads having more than one wind turbine blade, a concept that can be used in mathematics is a packing ratio, which is the ratio of filled volume divided by the total required volume. Due to the need for an assortment of clearances and margins around the payload during aircraft flight, loading and unloading (as described in International Patent Application No. PCT/US2020/061883, related to keepout zones, referenced above), and further due to the large irregular shapes of blades that do not package tightly together (as easily observed from FIGS. 11A-11C and 12), a cargo bay that is sized to load, unload, and hold a large variety of blades in various combinations might then see packing ratios approximately in the range of about 15% to about 25%. Therefore, multiplying an estimate of a group large wind turbine blades' densities above by a packing ratio from above yields a payload density approximately ranging from about 0.4 lbm/ft$^3$ to about 1.0 lbm/ft$^3$. Depending upon wing sizing, an aircraft's operating cost may only vary by approximately between about 25% to about 50% between its fully loaded configuration and its empty configuration. Therefore, it is not generally profitable for a cargo aircraft to operate at low fractions of its payload capacity.

Example Cargo Aircraft Sized by Wind Turbine Blade Length

Figure 13:
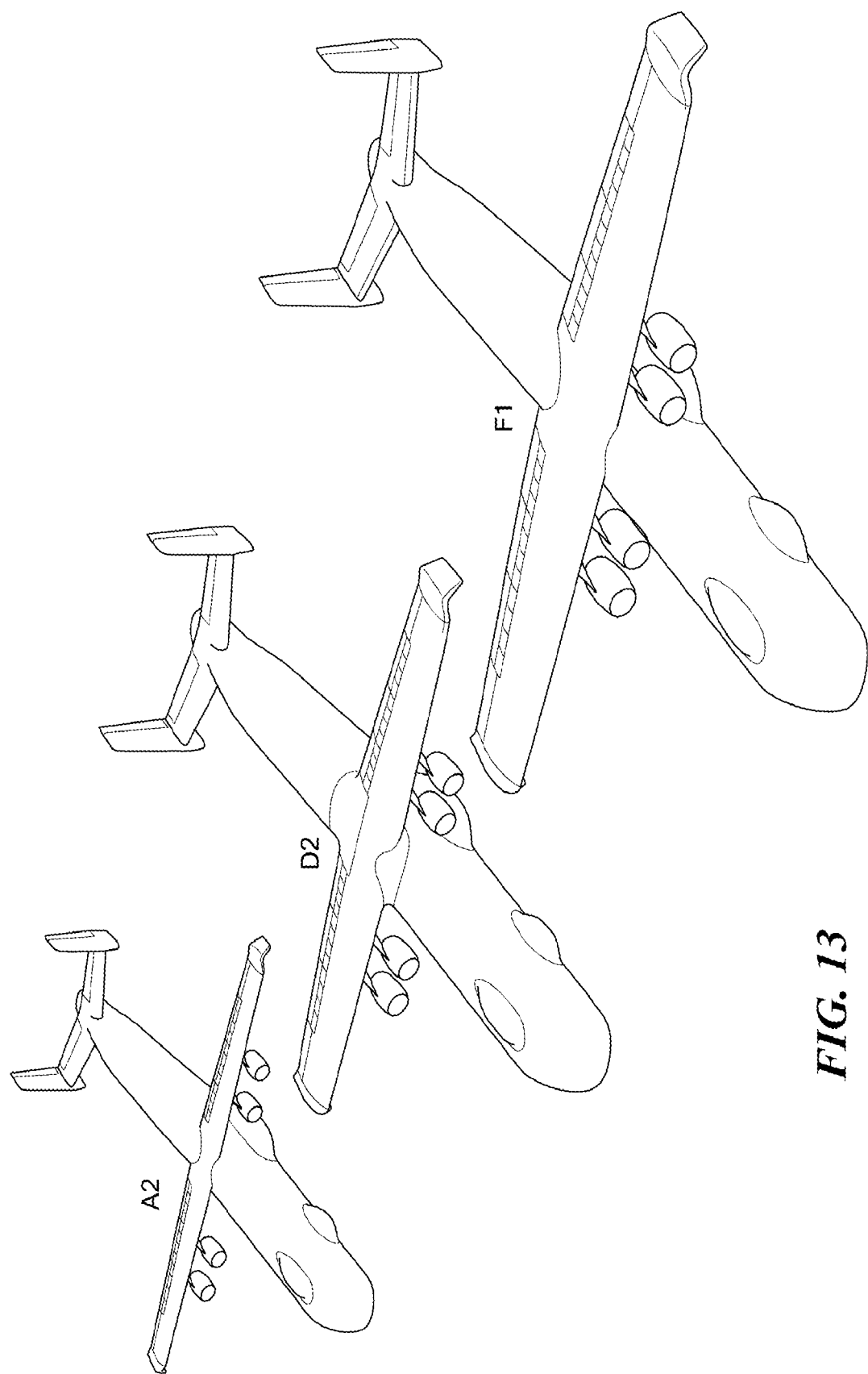
FIG. 13 is an isometric illustration of three example aircraft to scale of different sizes.

The results of the cargo bay sizing detailed above can be combined with the design aspects detailed herein along with traditional aircraft design techniques to generate a representative cargo aircraft design point for each payload design point of Table 1. Non-limiting examples of these representative aircraft design points are presented in Tables 2 and 3 for each payload design point of Table 1. Each aircraft design point represents a fully-lofted and aircraft design that embodies the aircraft design aspects described herein and is suitable for use as the sizing of a complete aircraft construction. Tables 2 and 3 provide the key characteristics and parameters of each design point, including payload weight, fuel weight, operating empty weight (OEW), maximum takeoff weight (MTOW), wing area, minimum thrust required for a roughly 2,000 ft STOL performance, fuselage diameter, fuselage length, cargo bay volume, payload density at MTOW, maximum aircraft weigh to wing reference area (W/S), minimum thrust to weight ratio (T/W) for STOL performance, maximum takeoff distance at MTOW, and/or maximum takeoff distance at MTOW in payload lengths. Maximum takeoff weight includes takeoff with a maximum payload weight. The maximum payload weight can be the maximum weight of a payload that can be carried in the aircraft, and this includes cargo (e.g., wind turbine blades), plus any cargo carrying fixtures that are required to safely transport the cargo and/or any required ballast to recover the aircraft CG position into the acceptable range after it is impacted by the loading of the cargo and fixtures. Each data point (e.g., A1-F2) represents an aircraft design using existing aircraft technologies (e.g., engines, airfoil shapes, control surfaces, etc.) and represent aircraft designs fully capable of achieving STOL taking off and landing and stable cruising and maneuvering while transporting the respective payload data point (e.g., A1-F2 of Table 1). FIG. 13 is an isometric illustration of three example aircraft to scale of different sizes, specifically A2, D2, and F1. A2 is the smallest and lightest of the designs, F1 the largest and heaviest, and D2 the most similar to the aircraft 100 of FIGS. 1A and 7A.

Moreover, the aircraft design points represent airframe designs that are achievable with little to no composite materials, thus significantly reducing manufacturing costs and complexity. All of the example aircraft data points utilize high-wing design (e.g., the primary wing box passes above the cargo bay 170), and due to the size of the wing and the cargo bay, the wings 182, 184 of the example aircraft data points utilized are connected to the fuselage at a reinforced region using, for example, perimeter box beams around the fuselage wing cutout. As the size of a large cargo aircraft grows, so too does the fuselage wing cutout. Because of this, for the example aircraft 100 of FIG. 1A (e.g., aircraft design point D2), both the longitudinal and lateral distances of the cutout are larger than any other aircraft in history and, as such, the failure modes of the structure along the edges of the cutout are different than previous smaller aircraft that have similar wing position and attachment schemes. The failure modes for the aircraft 100 are driven more by stability (e.g., buckling) and local beam torsion than that of smaller aircraft with smaller cutouts. For that reason a closed box section can be used to stiffen the cutout. Additional details of the use of perimeter box beams are provided in International Patent Application No. PCT/US2021/063800, entitled "AIRCRAFT FUSELAGE WING ATTACHMENT CUTOUT CONFIGURATIONS INCORPORATING PERIMETER BOX BEAMS," and filed Dec. 16, 2021, the content of which is incorporated by reference herein in its entirety.

erates an aircraft during takeoff much more quickly, which shortens the overall field length required for takeoff.

Throughout the takeoff procedure, weight is the dominant resisting term along the longitudinal axis via both inertia (e.g., resistance to acceleration), as well as directly by rolling friction force, particularly because drag becomes negligible at low airspeeds. Higher weight implies more

TABLE 2

Design points for cargo aircraft embodiments

| Design Point (none) | Aircraft Payload Including Fixtures (lbm) | Aircraft Fuel at Max Payload (lbm) | Aircraft OEW (lbm) | Aircraft MTOW (lbm) | Wing Area (ft^2) | Min. Shipset Thrust (lbf) | Fuselage Diameter (m) | Fuselage Length (m) |
|---|---|---|---|---|---|---|---|---|
| A1 | 97,000  | 65,000  | 249,760 | 411,760   | 5,527  | 165,000 | 7.43  | 79  |
| A2 | 76,000  | 50,000  | 195,689 | 321,689   | 4,649  | 130,000 | 7.43  | 79  |
| B1 | 131,000 | 85,000  | 337,305 | 553,305   | 7,427  | 225,000 | 8.42  | 90  |
| B2 | 103,000 | 70,000  | 265,210 | 438,210   | 6,333  | 175,000 | 8.42  | 90  |
| C1 | 171,000 | 95,000  | 440,299 | 706,299   | 9,481  | 285,000 | 9.41  | 100 |
| C2 | 133,000 | 80,000  | 342,455 | 555,455   | 8,027  | 225,000 | 9.41  | 100 |
| D1 | 215,000 | 115,000 | 553,593 | 883,593   | 11,860 | 360,000 | 10.40 | 111 |
| D2 | 167,000 | 95,000  | 430,000 | 692,000   | 10,000 | 280,000 | 10.40 | 111 |
| E1 | 266,000 | 140,000 | 684,910 | 1,090,910 | 14,643 | 440,000 | 11.39 | 122 |
| E2 | 206,000 | 115,000 | 530,419 | 851,419   | 12,304 | 345,000 | 11.39 | 122 |
| F1 | 321,000 | 165,000 | 826,527 | 1,312,527 | 17,618 | 530,000 | 12.38 | 132 |
| F2 | 248,000 | 135,000 | 638,563 | 1,021,563 | 14,762 | 415,000 | 12.38 | 132 |

TABLE 3

Design points for cargo aircraft embodiments, cont.

| Design Point (none) | Maximum Payload Length (meters) | Payload Volume (ft^3) | Fully Loaded Payload Density (lbm/ft^3) | Max. W/S (psf) | Min. T/W (lbf/lbm) | Takeoff Distance (m) | Takeoff Distance (payloads) |
|---|---|---|---|---|---|---|---|
| A1 | 75  | 121,000 | 0.80 | 74.5 | 0.401 | 671 | 9.0 |
| A2 | 75  | 121,000 | 0.63 | 69.2 | 0.404 | 587 | 7.8 |
| B1 | 85  | 177,000 | 0.74 | 74.5 | 0.407 | 671 | 7.9 |
| B2 | 85  | 177,000 | 0.58 | 69.2 | 0.399 | 624 | 7.3 |
| C1 | 95  | 245,000 | 0.70 | 74.5 | 0.404 | 662 | 7.0 |
| C2 | 95  | 245,000 | 0.54 | 69.2 | 0.405 | 619 | 6.5 |
| D1 | 105 | 333,000 | 0.65 | 74.5 | 0.407 | 667 | 6.4 |
| D2 | 105 | 333,000 | 0.50 | 69.2 | 0.405 | 603 | 5.7 |
| E1 | 115 | 439,000 | 0.61 | 74.5 | 0.403 | 668 | 5.8 |
| E2 | 115 | 439,000 | 0.47 | 69.2 | 0.405 | 614 | 5.3 |
| F1 | 125 | 561,000 | 0.57 | 74.5 | 0.404 | 671 | 5.4 |
| F2 | 125 | 561,000 | 0.44 | 69.2 | 0.406 | 612 | 4.9 |

The ratio of an aircraft's available thrust to its weight (Min. T/W in Table 3) is an important parameter for takeoff field performance and is presented here to provide further support the feasibility of the present designs. A higher thrust-to-weight ratio implies higher thrust with lower weight, improving takeoff field performance by reducing the required field length for takeoff, and vice versa.

Throughout a takeoff procedure, thrust is the dominant accelerating force term along the longitudinal axis. Thrust is the force which overcomes rolling friction and drag to accelerate the aircraft during its ground roll initially. Prior to takeoff rotation, thrust accelerates the aircraft from rest to both an airspeed that exceeds the stall speed of the aircraft in the takeoff configuration and an airspeed where the horizontal stabilizer and elevator sizes are capable of rotating the aircraft. After the takeoff rotation, thrust makes it possible for the aircraft to climb from zero relative potential energy to a higher value corresponding with the post-takeoff obstacle clearance altitude. Therefore, higher thrust accelerates an aircraft during takeoff much more quickly, which shortens the overall field length required for takeoff.

inertia, which takes a longer time and distance at the same level of thrust to accelerate during takeoff. The rolling friction force is typically determined as a rolling friction coefficient times the difference between lift and weight. Additionally, the relative potential energy which is necessary to be accumulated by the power of the propulsors is directly proportional to the aircraft weight—that is, higher weight aircraft at the same level of thrust takes a longer time (and thus, distance) to climb to reach an obstacle clearance height after lifting off of the ground.

Thrust-to-weight ratio (T/W) is a nondimensional parameter that is central in determining takeoff field performance and differentiating high performance and low performance aircraft during takeoff. However, aircraft engines are heavy and expensive, and increasing thrust typically increases weight and drag. Thus, the design points presented herein utilized existing aircraft engine specifications capable of delivering the thrust and weight necessary to obtain the desired STOL performance. For the examples presented herein, air-breathing propulsion was used, such as commercially available high bypass turbofan engines.

The ratio of an aircraft's weight to its wing reference area (W/S) is another important parameter for takeoff field performance. This is a dimensional parameter that has units of pressure, and in unaccelerated steady-state flight, this pressure represents the amount of lift per unit wing area that is necessary to maintain flight. In the same conditions, the aircraft must create the same amount of lift as its own weight to stay in flight. This parameter is called the wing loading. A lower wing loading implies less weight to carry, or a larger wing to carry the same amount of weight, improving takeoff field performance by reducing the airspeed that is necessary to lift off.

Wing designs are mature technology, and for a similar level of design effort and design and manufacturing complexity and cost, typically a small range of maximum lifting coefficient results. The maximum lift coefficient relates directly as the wing loading, divided by the minimum dynamic pressure required for takeoff. Dynamic pressure varies exactly with the square of airspeed. Therefore, a lower wing loading reduces the required airspeed for takeoff (at a half power of proportionality). Accordingly, in view of the present designs, takeoff can occur over shorter distances because an aircraft with a low wing loading need not accelerate to as high of speeds.

Design Performance of Cargo Aircraft Examples

Aspects of the present disclosure provide for an entire family of aircraft occupying a specific design space in which the low-density, high cargo volume, high cargo length as function of fuselage length, and short take off length are all optimized in view of specific target maximum payload lengths and aspects ratios (e.g., the cargo bay length per area or width) that are specifically derived from wind turbine blades. Accordingly, the twelve example cargo aircraft design points of Tables 2 and 3 (i.e., A1-F2) are plotted in FIGS. 14A, 15A, 16A, and 17A, and each specific cargo aircraft embodiment represents the novel cargo aircraft design space presented herein. FIGS. 14B, 15B, 16B, and 17B present zoomed-in view of the data of the preceding figure to better observe the prior art aircraft data. FIGS. 14A-17B include a plurality of representative comparison points from existing aircraft. The comparison aircraft data points were chosen from a plurality of different aircraft categories (e.g., design spaces), such as small business passenger aircraft ('bizjets'), mid-size regional commercial passenger planes ('regional jet'), large commercial passenger planes ('commercial pax'), large commercial cargo aircraft ('commercial freighters'), large military transport aircraft ('military transport,' e.g., Lockheed C-5 Galaxy), a selection of existing STOL aircraft, and the largest special purpose cargo transport aircraft ('special purpose,' e.g., Antonov AN-225, Airbus Super Guppy, and the Boeing Dreamlifter). FIGS. 14A-17B illustrate the extreme differences that exist between the characteristics of the examples of the present design space and a representative sample of all existing aircraft.

More particularly, an effort was made to include comparison data from many sources, and in particular, data points of large aircraft that represent the closest designs to the currently discussed unique design space. Examples of illustrated bizjets include the HondaJet, the Pilatus PC-24, and a variety of Cessna aircraft, such as the Mustang and different CitationJet models. Examples of illustrated commercial freighters include the Boeing 747-8F, 777F, 767-300F/BCF, 757-200SF and a variety of 737 variants, as well as the Airbus A330-200F, A300-600F and A310-300. Examples of illustrated commercial passenger planes include the Boeing 787, various Douglas or McDonnell Douglas models up through the MD-11F/ER, and the Tupolev Tu-204. Examples of illustrated military transports include the Lockheed Martin C-130 and C-5, the Boeing C-17, the Embraer KC-390, the Airbus A400M, and a variety of other lesser known foreign models. Examples of illustrated regional jets include several families of regional jets that vary in size including British Aerospace's AvroRJ family and ATPF, Bombardier's Dash8 series, and Bombardier's CRJ family. Examples of illustrated STOL aircraft include the DeHavilland family of DHC-4/-5/-6/-7, the IAI Arava, and the CASA Aviocar, among others. Finally, the most pertinent examples of special-purpose large freighter aircraft include the Boeing DreamLifter, the Airbus Beluga/BelugaXL, the Aero Spacelines SuperGuppy, and the Antonov An-225. All comparison data from existing aircraft are sourced from publicly available data, such as published three-view drawings and published performance data, predominately from the vehicle original equipment manufacturers (OEMs) themselves.

Payload Length Efficiency

Figure 14A:
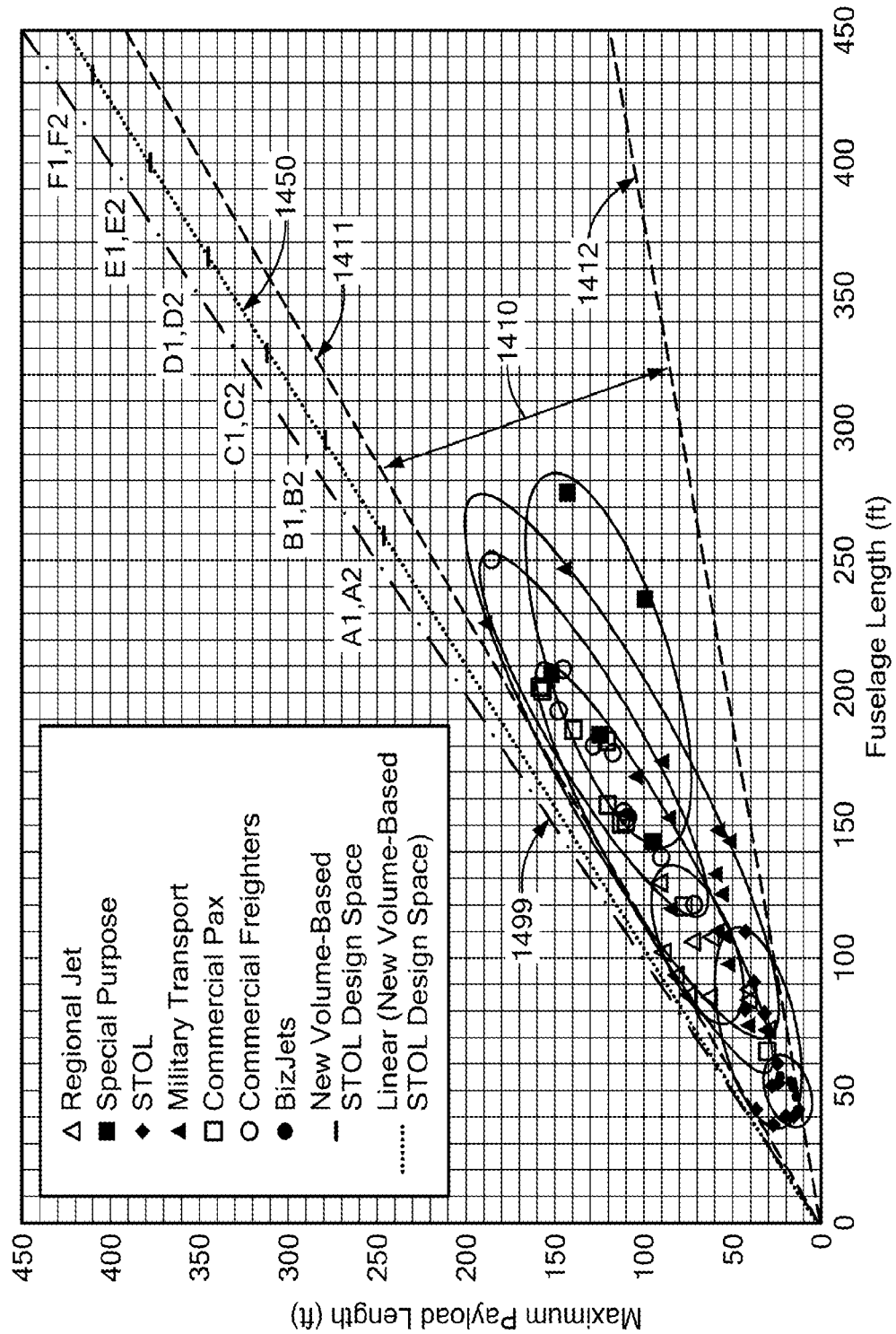
FIG. 14A is a graph of maximum payload length versus fuselage length for a large representative sample of existing aircraft designs as well as twelve aircraft design examples of the present disclosure.
Figure 14B:
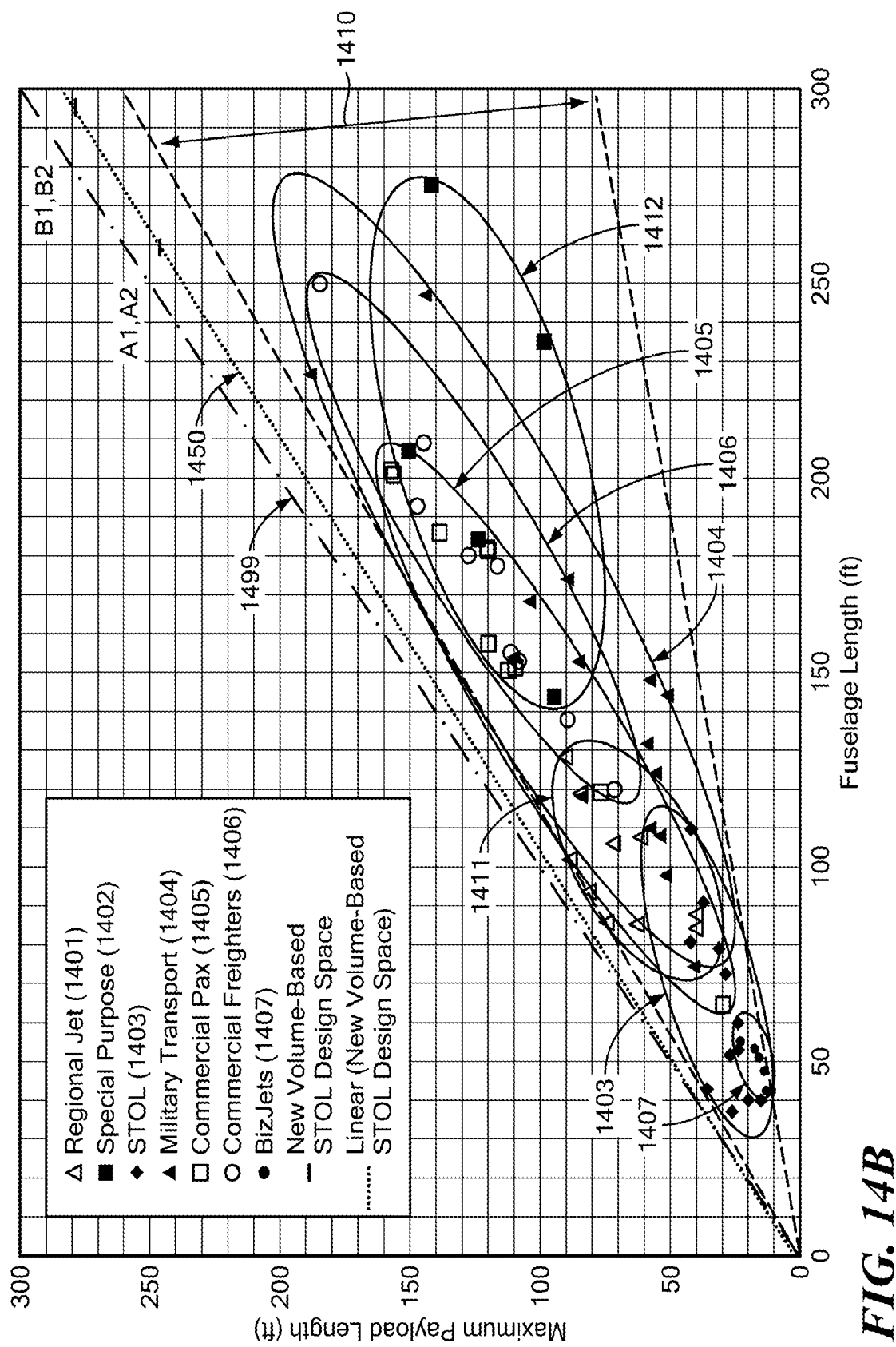
FIG. 14B is the graph of maximum payload length versus of FIG. 14A with a truncated fuselage length range to more clearly show the representative sample of existing aircraft designs.

FIG. 14A is a graph of maximum payload length versus fuselage length. FIG. 14A illustrates the novel design space relationship between the transportable cargo length versus the overall vehicle length (e.g., the payload length efficiency). In FIGS. 14A and 14B, the slope of the lines 1411, 1412, 1450 in this figure are essentially a maximum payload length efficiency of aircraft for carrying long payloads, which are bounded by a slope of 1.0 (illustrated as line 1499) because the maximum payload length increases to the full fuselage length. In other words, an enclosed payload's length cannot theoretically exceed the length of the enclosing vehicle. FIG. 14A plots the twelve example cargo aircraft design points of Tables 2 and 3 (i.e., A1-F2), as well as data points for the representative sample of existing aircraft. For the representative sample of existing aircraft, maximum payload length was calculated as the total length of the respective cargo area, irrespective of whether or not the cargo area was a continuous cargo bay as a modification to an existing design to make the cargo area continuous would likely be feasible for one skilled in the art. A linear best-fit line 1450 is plotted for the example cargo aircraft design points, and a linear upper bound line 1411 and a linear lower bound line 1412 are drawn to completely contain all of the data points of the representative sample of existing aircraft. Accordingly, the space between the upper and lower bounds (shown as 1410) represents the existing design space of known aircraft. Notably, the best-fit line 1450 for the example cargo aircraft design points is markedly distinct from the existing design space 1410.

The example cargo aircraft family design points in this disclosure (i.e., A1-F2) are extremely efficient at carrying long payloads, and they allow payloads which are nearly 97% of the full fuselage length. This implies an amount of wasted payload length for the fuselage length of about 3% for the current disclosure, as compared to 13+% for the most efficient aircraft in the design space 1410 of existing aircraft. Accordingly, the current disclosure's wasted payload length is over 70% lower than the most efficient aircraft in the design space of existing aircraft.

In FIGS. 14A and 14B, individual design spaces of the existing aircraft data points are identified, small business passenger aircraft ('bizjets') shown in region 1401, mid-size regional commercial passenger planes ('regional jet') shown in region 1407, large commercial passenger planes ('commercial pax') shown in region 1405, large commercial cargo aircraft ('commercial freighters') shown in region 1406, large military transport aircraft ('military transport') shown in region 1404, the selection of existing STOL aircraft shown in region 1403, and the largest special purpose cargo transport aircraft ('special purpose') shown in region 1402.

In view of FIG. 14B, considering the maximum payload length efficiency of existing aircraft, it is apparent that aircraft designs that are typically a higher aspect ratio—such as business jets, regional jets or certain commercial passenger jets—have the highest maximum payload length efficiency of existing aircraft, despite being far below that of the cargo aircraft family design points in the current disclosure. The physics of powered flight and aircraft design are conducive to smaller aircraft more easily achieving high payload length efficiency and, as shown in the representative sample, as fuselage length increases, there is no corresponding increase in payload length efficiency.

Payload Density

Figure 15A:
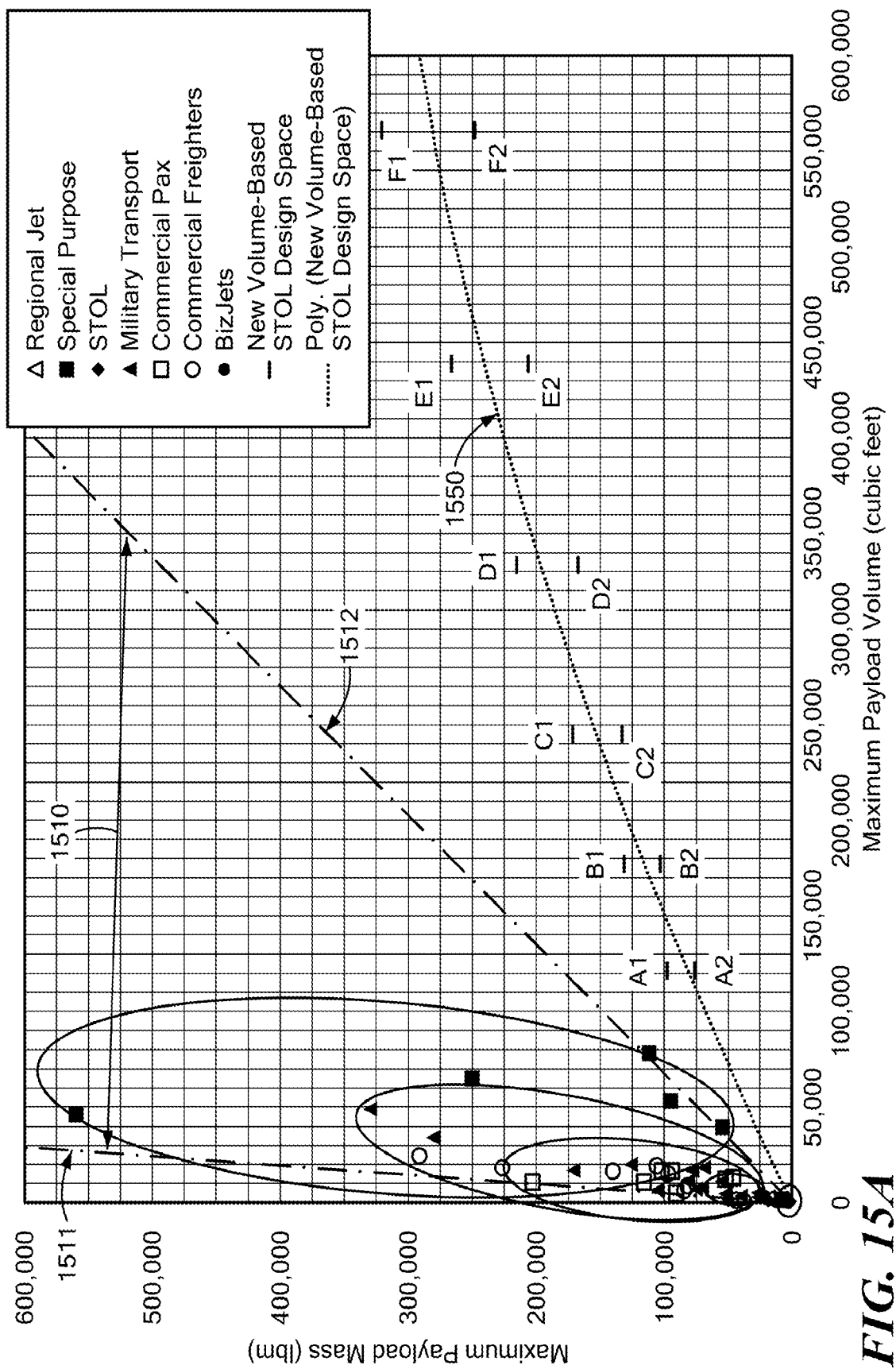
FIG. 15A is a graph of maximum payload mass versus maximum payload volume for the same large representative sample of existing aircraft designs as well as the twelve aircraft design examples of FIG. 14A.
Figure 15B:
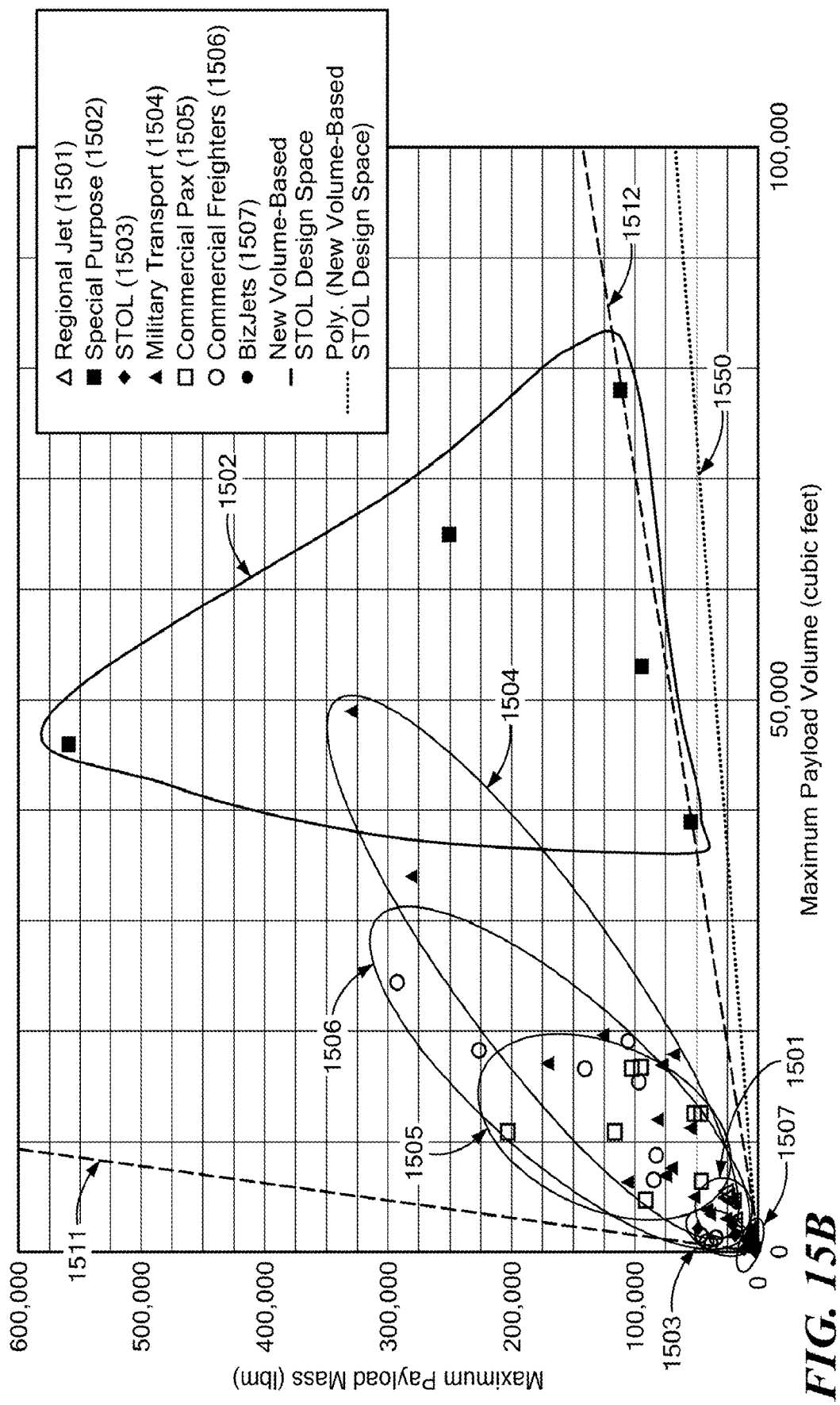
FIG. 15B is the graph of maximum payload mass versus maximum payload volume with a truncated maximum payload volume range to more clearly show the representative sample of existing aircraft designs.

FIGS. 15A and 15B are graphs of maximum payload mass versus maximum payload volume and illustrate the extreme low density design around which examples of the present disclose are found. FIGS. 15A and 15B plot the same twelve example cargo aircraft design points of Tables 2 and 3 (i.e., A1-F2), as well as the same data points for the representative sample of existing aircraft. A polynomial best-fit line 1550 is plotted for the example cargo aircraft design points, and a linear upper bound line 1511 and a linear lower bound line 1512 are drawn to completely contain all of the data points of the representative sample of existing aircraft. Accordingly, the space between the upper and lower bounds (shown as 1510) represents the existing design space of known aircraft. Notably, the best-fit line 1550 for the example cargo aircraft design points is markedly distinct from the existing design space 1510. In FIG. 15A, the slopes of the curves 1511, 1512, 1550 represent the payload density of an aircraft that is fully loaded to both payload mass and payload volume limits. It is apparent from FIGS. 15A and 15B that the example cargo aircraft family design points in this disclosure follow a payload density which is approximately in the range of about 60% to about 70% lower than even the lowest existing aircraft designs.

In FIGS. 15A and 15B, individual design spaces of the existing aircraft data points are identified, small business passenger aircraft ('bizjets') shown in region 1501, mid-size regional commercial passenger planes ('regional jet') shown in region 1507, large commercial passenger planes ('commercial pax') shown in region 1505, large commercial cargo aircraft ('commercial freighters') shown in region 1506, large military transport aircraft ('military transport') shown in region 1504, the selection of existing STOL aircraft shown in region 1503, and the largest special purpose cargo transport aircraft ('special purpose') shown in region 1502.

Takeoff Length Discussion

FIGS. 16A-17B illustrate takeoff performance characteristics of examples of the present disclosure in comparison to existing aircraft. The cargo aircraft examples of the present disclosure are configured to transport extremely long wind turbine blades with minimal required takeoff distance. Takeoff physics are governed by a handful of physical inputs as well as regulatory considerations.

In brief, takeoff begins with the aircraft accelerating from rest, with the aircraft weight supported by a combination of ground reaction forces through the landing gear and lift forces generated by the aircraft, and the aircraft's forwards acceleration driven by engine thrust and resisted by mass inertia and/or aerodynamic drag acting on the vehicle external surfaces and rolling friction acting on the landing gear. Notably, aircraft drag is composed primarily of lift-related induced drag as well as parasite drag which is unrelated to lift; induced drag during takeoff is significantly reduced by ground effects. Initially, aerodynamic lift and drag are negligible, and the physics are overwhelmingly governed by any thrust lag associated with engines spooling up (if aircraft braking is insufficient to hold the aircraft stationary at maximum thrust), and rolling friction. As speeds increase, aerodynamic forces increase with the square of airspeed; aircraft lift slowly reduces the portion of vehicle weight acting on the landing gear and contributing to rolling friction, while aircraft drag increases with increasing airspeed and increasing lift. Aircraft weight does decrease a negligibly small amount as fuel is burned.

Upon accelerating to a rotation speed, the pilot can rotate an elevator or similar flight control, and downwards aerodynamic lift on the horizontal stabilizer creates a nose-upwards vehicle rotation, which increases lift on the aircraft wings until it lifts off of the ground. The vehicle climbs over a supposed obstacle at a reference height and then transitions to successive stages of a climb phase.

Field lengths generally account for not just all engines operating (AEO) cases, but also regulatory considerations that include the possibility of an engine failure or another scenario requiring the pilot to either abort the takeoff at speeds below decision speed and brake until the aircraft stops (rejected takeoff or RTO), or continue the takeoff (CTO) at speeds above decision speed with one engine inoperative (OEI).

The sources of each of these items is as follows. Aircraft weight is discussed elsewhere in this disclosure. Aerodynamic forces are calculated using a variety of classical handbook methods (Roskam, Hoerner, etc.) and validated using computational fluid dynamics (CFD), and in at least one design point, wind tunnel (WT) testing. Friction coefficients are standard values available widely in aerospace literature.

Embodiments of the present disclosure achieve an extremely short takeoff field length at least in part due to: the kinked fuselage enabling significant rotation before takeoff without tailstrike, lower mass (e.g., the vehicle is sized by volume and low-density cargo), a large thrust-to-weight ratio, large wings resulting in low wing loading, sizeable high lift devices on the trailing edge which augment lift and shift maximum lift to low angles of attack that are more easily achievable for a long vehicle which might be susceptible to tails strike, a beneficial California Bearing Ratio (CBR) that keeps the aircraft on top of soil at semi-prepared fields, and large spoilers and thrust reversers and other measures which may provide a braking benefit during landing or in the event of a rejected takeoff (RTO).

Takeoff Distance Per Maximum Payload Length

Figure 16A:
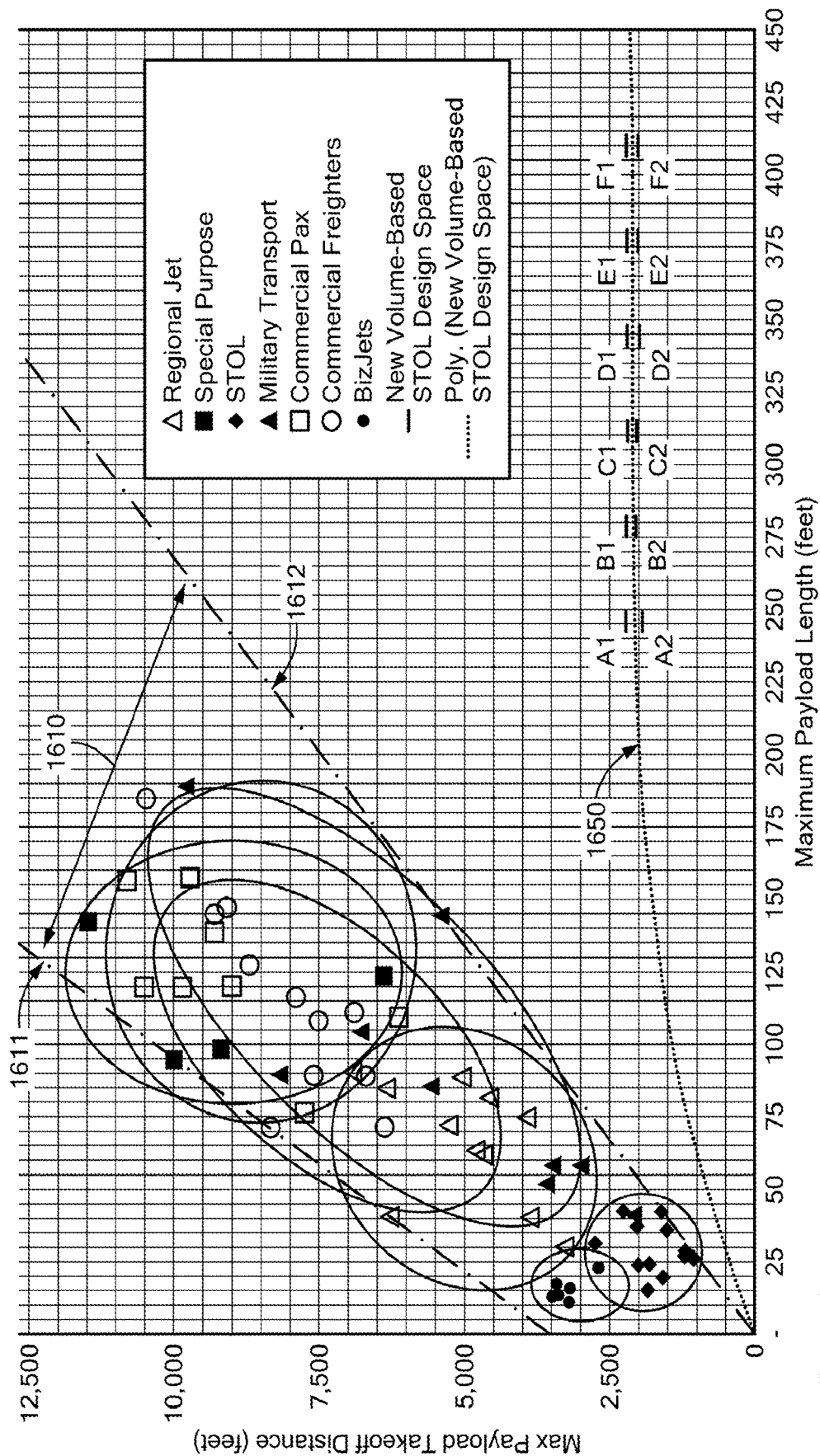
FIG. 16A is a graph of maximum payload takeoff distance versus maximum payload length for the same large representative sample of existing aircraft designs as well as the twelve aircraft design examples of FIG. 14A.
Figure 16B:
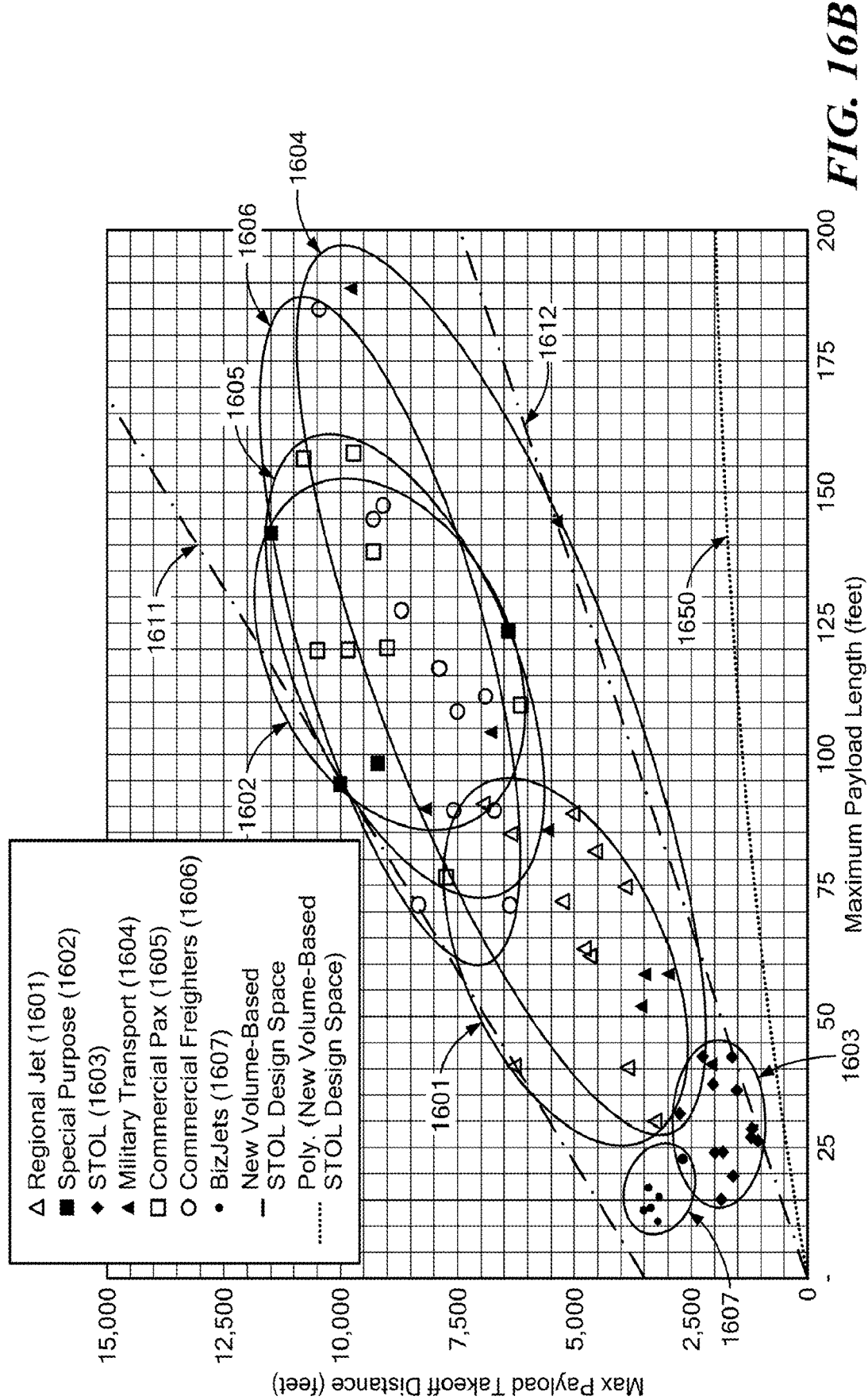
FIG. 16B is a graph of maximum payload takeoff distance versus maximum payload length with a truncated maximum payload length range to more clearly show the representative sample of existing aircraft designs.

FIG. 16A is a graph of maximum payload takeoff distance (e.g., takeoff field length, TOFL) versus maximum payload length. FIG. 16B is a zoomed-in view of the graph of FIG. 16A. FIGS. 16A and 16B illustrate the significant distinction between aspects of the present disclosure and existing aircraft in terms of takeoff performance in payload lengths. FIGS. 16A and 16B plot the same twelve example cargo aircraft design points of Tables 2 and 3 (i.e., A1-F2), as well as the same data points for the representative sample of existing aircraft. A polynomial best-fit line 1650 is plotted for the example cargo aircraft design points, and a linear upper bound line 1611 and a linear lower bound line 1612 are drawn to completely contain all of the data points of the representative sample of existing aircraft. Accordingly, the space between the upper and lower bounds (shown as 1610)

represents the existing design space of known aircraft. Notably, the best-fit line 1550 for the example cargo aircraft design points is markedly distinct from the existing design space 1610.

In FIG. 16A, the slope of the curves 1611, 1612, 1650 in this figure are essentially the number of maximum payload lengths needed for a runway to takeoff each aircraft. It can be seen that the example cargo aircraft family design points in this disclosure are at least a half order of magnitude below any existing aircraft shown, and at least a full order of magnitude lower than the average existing aircraft shown.

In FIGS. 16A and 16B, individual design spaces of the existing aircraft data points are identified, small business passenger aircraft ('bizjets') shown in region 1601, mid-size regional commercial passenger planes ('regional jet') shown in region 1607, large commercial passenger planes ('commercial pax') shown in region 1605, large commercial cargo aircraft ('commercial freighters') shown in region 1606, large military transport aircraft ('military transport') shown in region 1604, the selection of existing STOL aircraft shown in region 1603, and the largest special purpose cargo transport aircraft ('special purpose') shown in region 1602.

One of the most appropriate units for comparing takeoff distance between vehicles is "maximum payload lengths required to takeoff." This value can be determined by taking the ratio of the takeoff distance divided by the maximum payload length, for each design point detailed herein. Completing that gives an approximate range of about 4.9 max payload lengths for the longer/heavier design points (e.g., F1), to about 9.0 max payload lengths for the shorter/lighter design points (e.g., A2). These are all "fully loaded" values. The max payloads lengths can be reduced by increasing wing area and thrust, both of which increase cost and weight of the aircraft, but existing technologies, such as a composite airframe may offset this. Overall, max payload takeoff lengths of about four (4) or less are achievable with existing technologies and the design examples presented herein, but may be cost prohibitive given how much extra thrust and wing area would be required, but this range is nevertheless considered within the scope of this disclosure. Similarly, for the smallest and lightest design points, max payload lengths do not have a well-defined upper limit, at least because this implies reducing performance in the parameter that is being central to the design space, but design examples with less thrust and wing area may have max payload takeoff lengths approximately in the range of about 10 to about 15, especially if weaker engines are desired (e.g., if electric propulsion and/or propeller engines are used, both of which provide less thrust than the high bypass turbofan engines used for the design points, but may provide other advantages).

It may seem counterintuitive that the number of payload lengths required to takeoff goes down as the payload gets shorter and lighter, but the fact remains that as the payload length decreases to zero, the design is still left with some aircraft weight that requires some takeoff distance, and that takeoff distance is being divided by a very small number. So, moving from the longer/heavier design points towards the shorter/lighter design points, the weight of the aircraft comes down slowly, and the takeoff distance also reduces slowly, but the reference length used to nondimensionalize the takeoff distances reduces rapidly, implying that the ratio of takeoff distance to payload length increases overall.

Calculation of takeoff distances for unloaded configuration of the example aircraft design points of the present disclosure reduce the aircraft weight by an amount that varies for the different design points, but is approximately in the range of about a 20% to about a 40% reduction to each design point's maximum takeoff weight by a combination of the payload mass and some additional fuel mass. This reduces the number of maximum payload lengths required for the aircraft to takeoff by approximately half. Therefore, on the low end of the range, with minimum to no cargo mass, the value can be reduced to less than about five (5) maximum payload lengths for the smallest design points and less than about three (3) maximum payload lengths for the largest.

Takeoff Distance Per Payload Volume

Figure 17A:
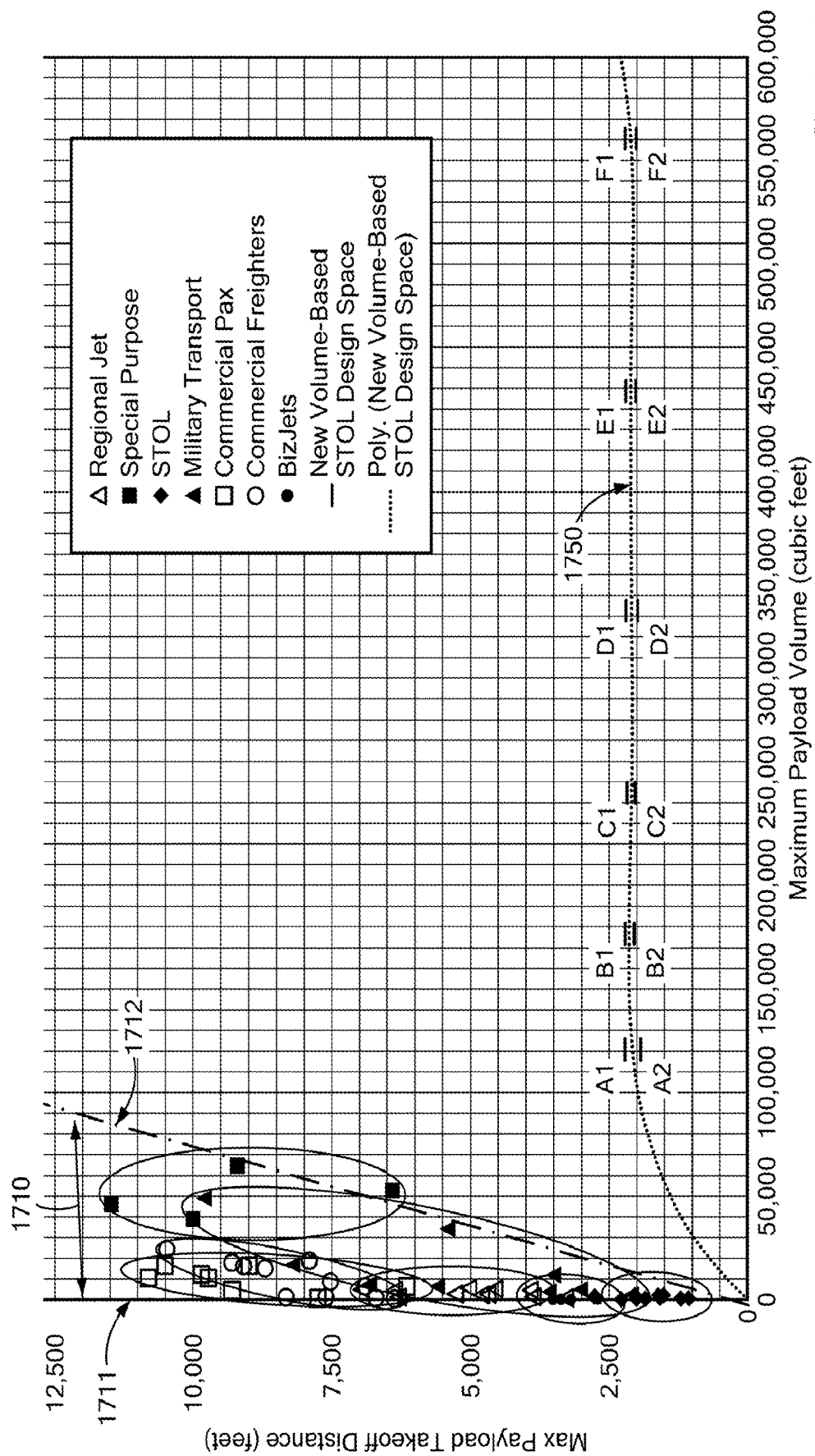
FIG. 17A is a graph of maximum payload takeoff distance versus maximum payload volume for the same large representative sample of existing aircraft designs as well as the twelve aircraft design examples of FIG. 14A.
Figure 17B:
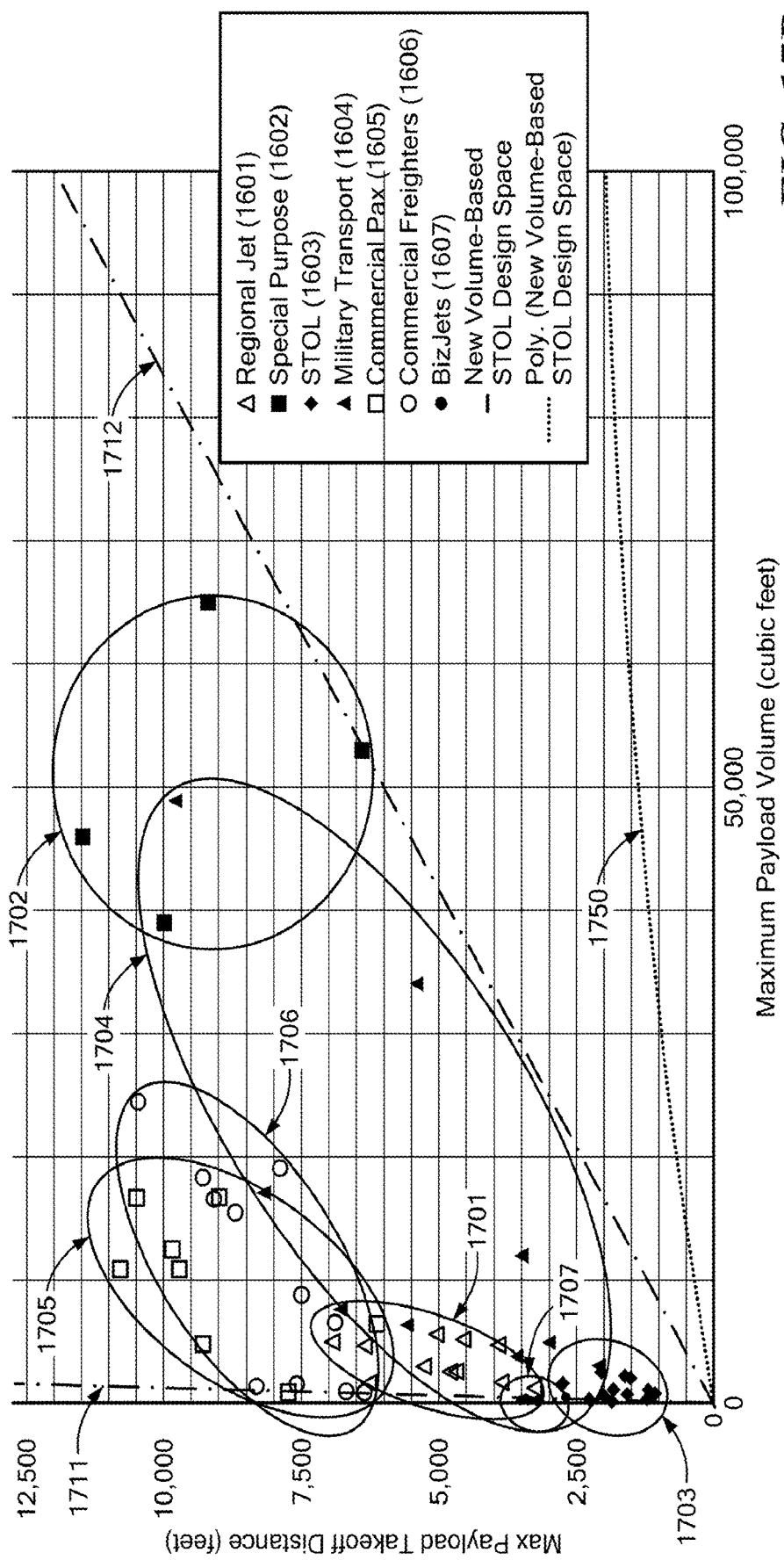
FIG. 17B is a graph of maximum payload takeoff distance versus maximum payload volume with a truncated maximum payload volume range to more clearly show the representative sample of existing aircraft designs.

FIG. 17A is a graph of maximum payload takeoff distance versus maximum payload volume. FIG. 17B is a zoomed-in view of the graph of FIG. 17A. FIGS. 17A and 17B plot the same twelve example cargo aircraft design points of Tables 2 and 3 (i.e., A1-F2), as well as the same data points for the representative sample of existing aircraft. A polynomial best-fit line 1750 is plotted for the example cargo aircraft design points, and a linear upper bound line 1511 and a linear lower bound line 1712 are drawn to completely contain all of the data points of the representative sample of existing aircraft. Accordingly, the space between the upper and lower bounds (shown as 1710) represents the existing design space of known aircraft. Notably, the best-fit line 1750 for the example cargo aircraft design points is markedly distinct from the existing design space 1710.

FIG. 17A indicates that the cargo aircraft family design points in this disclosure offer maximum-payload takeoff field lengths that rival the shortest lengths out of any of the existing aircraft shown, while offering maximum payload volumes that are nearly or more than a full order of magnitude larger than any of the existing aircraft shown.

In FIGS. 17A and 17B, individual design spaces of the existing aircraft data points are identified, small business passenger aircraft ('bizjets') shown in region 1701, mid-size regional commercial passenger planes ('regional jet') shown in region 1707, large commercial passenger planes ('commercial pax') shown in region 1705, large commercial cargo aircraft ('commercial freighters') shown in region 1706, large military transport aircraft ('military transport') shown in region 1704, the selection of existing STOL aircraft shown in region 1703, and the largest special purpose cargo transport aircraft ('special purpose') shown in region 1702.

In FIG. 17B, considering existing aircraft, special-purpose transport aircraft offer the largest cargo volumes (they are still nearly a full order of magnitude smaller than the cargo aircraft family design points in this disclosure). These same aircraft also require several times higher the takeoff distance of any of the existing aircraft (or the cargo aircraft family design points in this disclosure). Overall, FIGS. 17A and 17B illustrate a significant distinction between aspects of the present disclosure and existing aircraft in terms of takeoff performance with respect to payload volume, and beyond any amount owing to a simple design choice. Simply, the example cargo aircraft of the present disclosure represent an entirely new type of aircraft that achieves performance characteristics never seen before and not able to be achieved without the various aspects of the present disclosure, either alone or in any combination.

In FIGS. 14A-17B, all field performance numbers assume takeoff at maximum takeoff weight (MTOW) and sea level (SL) conditions at International Standard Atmosphere (ISA) temperature. In these examples, thrust was held constant in a four-engine configuration with a commercially available, off-the-shelf (COTS) engine that is proven in operation for several years, and wing area is held constant at approximately 10,000 ft$^2$ because ICAO Group 6 limitations on wing span already limit the aircraft wing area to a value below what is desirable for field performance.

FIGS. 14A-17B illustrate a plurality of "design spaces," which represent illustrative data points of individual existing aircraft therein, as well as data points of examples of the present disclosure. In the case of the existing aircraft data, the illustrated design space areas are for illustration purposes only and are not intended to represent actual limits or bounds on any particular design aspect.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. All publications and references cited herein are expressly incorporated herein by reference in their entirety.

Examples of the above-described embodiments can include the following:

1. A fixed-wing, powered, non-buoyant, enclosed cargo aircraft for carrying low-density payloads, the cargo aircraft comprising:
   a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay, the fuselage comprising:
     a forward portion containing a forward region of the continuous interior cargo bay, the forward portion defining a forward centerline along a longitudinal-lateral plane of the cargo aircraft;
     an aft portion containing an aft region of the continuous interior cargo bay, the aft portion defining an aft centerline extending above the longitudinal-lateral plane of the cargo aircraft; and
     a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline;
   wherein the maximum payload length is approximately in the range of about 75 meters to about 125 meters, and
   wherein the aircraft is capable of short takeoff and landing (STOL) operation carrying a maximum payload weight.

2. The cargo aircraft of example 1, wherein the fuselage comprises an empennage positioned vertically above the aft region of the continuous interior cargo bay.

3. The cargo aircraft of examples 1 or 2,
   wherein the cargo aircraft defines a lateral pitch axis about which the cargo aircraft is configured to rotate a maximal degree during a STOL operation while the aircraft is on the ground without striking the fuselage on the ground,
   wherein the aft portion extends from the kinked portion at an angle approximately equal to the degree of maximal rotation of the aircraft during the takeoff operation, and
   wherein the kinked portion is approximately vertically aligned with the lateral pitch axis.

4. The cargo aircraft of any of examples 1 to 3, wherein the aircraft defines a maximum payload length efficiency approximately in the range of about 90% to about 97%.

5. The cargo aircraft of any of examples 1 to 4, wherein the continuous interior cargo bay is configured to transport wind turbine blades having a longest linear dimension up to the maximum payload length.

6. The cargo aircraft of any of examples 1 to 5, wherein the continuous interior cargo bay defines a volume is between about 121,000 cubic feet and 561,000 cubic feet, the volume being approximately proportional to the maximum payload length.

7. A fixed-wing, powered, non-buoyant, enclosed cargo aircraft for carrying low-density payloads, the cargo aircraft comprising:
   a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay,
   wherein the aircraft is capable of short takeoff and landing (STOL) operation carrying a maximum payload weight, and
   wherein the maximum payload length is approximately in the range of about 75 meters to about 125 meters.

8. The cargo aircraft of example 7, wherein the STOL operation comprises performing a taking off operation from a runway in less than about 2,500 feet carrying the maximum payload weight.

9. The cargo aircraft of examples 7 or 8, wherein the STOL operation comprises performing a takeoff operation in less than about 10 times the maximum payload length.

10. The cargo aircraft of any of examples 7 to 9, wherein the continuous interior cargo bay is configured to transport wind turbine blades having a longest linear dimension up to the maximum payload length.

11. The cargo aircraft of any of examples 7 to 10, wherein the continuous interior cargo bay defines a volume is between about 121,000 cubic feet and 561,000 cubic feet, the volume being approximately proportional to the maximum payload length.

12. The cargo aircraft of any of examples 7 to 11, wherein the maximum payload length is greater than approximately 105 meters and the continuous interior cargo bay defines a volume between about 333,000 cubic feet and 561,000 cubic feet, the volume being approximately proportional to the maximum payload length.

13. The cargo aircraft of any of examples 7 to 12, wherein the fuselage comprises an empennage positioned vertically above an aft portion of the continuous interior cargo bay.

14. The cargo aircraft of any of examples 7 to 13, wherein the takeoff operation at maximum payload weight corresponds to a fully loaded aircraft with a cargo bay volume density less than about 1.0 lbm/ft$^3$.

15. The cargo aircraft of any of examples 7 to 14, wherein the cargo aircraft defines a maximum payload length efficiency of greater than about 90%.

16. The cargo aircraft of example 15, wherein the aircraft defines a maximum payload length efficiency approximately in the range of about 90% to about 97%.
17. The cargo aircraft of examples 15 or 16, wherein an aft end of the continuous interior cargo bay is configured to receive an aft end of an elongated contiguous payload from a forward end of the fuselage to dispose the elongated contiguous payload throughout substantially all of a length of the continuous interior cargo bay, the elongated contiguous payload having a length equal to the maximum payload length.
18. The cargo aircraft of any of examples 7 to 17, wherein the fuselage comprises unswept first and second fixed wings.
19. The cargo aircraft of any of examples 7 to 18, wherein the aircraft comprises a configuration selected from the following group of configurations and resultant takeoff performance at maximum payload weight:
    the maximum payload length is approximately in the range of about 75 meters and about 85 meters and the aircraft is capable of performing a takeoff operation approximately in the range of within about 7.3 times and about 9.0 times the maximum payload length;
    the maximum payload length is approximately in the range of about 85 meters and about 95 meters and the aircraft is capable of performing a takeoff operation approximately in the range of within about 6.5 times and about 7.3 times the maximum payload length;
    the maximum payload length is approximately in the range of about 95 meters and about 105 meters and the aircraft is capable of performing a takeoff operation approximately in the range of within about 5.7 times and about 6.5 times the maximum payload length;
    the maximum payload length is approximately in the range of about 105 meters and about 115 meters and the aircraft is capable of performing a takeoff operation approximately in the range of within about 5.3 times and about 5.7 times the maximum payload length; and
    the maximum payload length is approximately in the range of about 115 meters and about 125 meters and the aircraft is capable of performing a takeoff operation approximately in the range of within about 4.9 times and 5.3 times the maximum payload length.
20. The cargo aircraft of any of examples 7 to 19, wherein the fuselage comprises:
    a forward portion containing a forward region of the continuous interior cargo bay, the forward portion defining a forward centerline along a longitudinal-lateral plane of the cargo aircraft;
    an aft portion containing an aft region of the continuous interior cargo bay, the aft portion defining an aft centerline extending above the longitudinal-lateral plane of the cargo aircraft;
    a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline; and
    wherein the aft region of the continuous interior cargo bay extends along more than about 90% of a length of the aft portion of the fuselage.
21. The cargo aircraft of example 20,
    wherein the cargo aircraft defines a lateral pitch axis about which the cargo aircraft is configured to rotate a maximal degree during a STOL operation while the aircraft is on the ground without striking the fuselage on the ground,
    wherein the aft portion extends from the kinked portion at an angle approximately equal to the degree of maximal rotation of the aircraft during the takeoff operation, and
    wherein the kinked portion is approximately vertically aligned with the lateral pitch axis.
22. The cargo aircraft of example 21, wherein the bend angle is approximately in the range of about 4 degrees to about 16 degrees with respect to the longitudinal-lateral plane of the cargo aircraft.
23. The cargo aircraft of examples 21 or 22, wherein the bend angle is approximately equal to the degree of maximal rotation of the aircraft during the STOL operation.
24. The cargo aircraft of any of examples 21 to 23, wherein the bend angle is approximately equal to the degree of maximal rotation of the aircraft during the takeoff operation.
25. The cargo aircraft of any of examples 7 to 24,
    wherein the fuselage defines a lateral pitch axis about which the cargo aircraft is configured to rotate a maximal degree during a STOL takeoff operation while the aircraft is still on the ground without striking the fuselage on the ground, the fuselage including:
    a forward portion containing a forward region of the continuous interior cargo bay, the forward portion defining a forward centerline along a longitudinal-lateral plane of the cargo aircraft; and
    an aft portion extending aft from the lateral pitch axis to the aft end and containing an aft region of the continuous interior cargo bay extending along a majority of a length of the aft portion of the fuselage, the aft portion defining an aft centerline extending above the longitudinal-lateral plane of the cargo aircraft,
26. The cargo aircraft of example 25, wherein an aft end of the aft region of the continuous interior cargo bay is configured to receive an aft end of an elongated contiguous payload from the forward end of the fuselage to dispose the elongated contiguous payload throughout substantially all of the length of the continuous interior cargo bay, wherein the elongated contiguous payload defines a maximum length approximately equal to the maximum payload length.
27. The cargo aircraft of examples 25 or 26, wherein the forward end of the fuselage comprises a cargo nose door configured to move to expose an opening into the continuous interior cargo bay through which an aft end of an elongate contiguous payload can be passed throughout substantially all of the length of the continuous interior cargo and to the aft end of the aft region of the continuous interior cargo bay.
28. The cargo aircraft of any of examples 25 to 27, wherein the fuselage comprises a kinked portion forming a junction in the fuselage between the forward portion and the aft portion of the fuselage and between the forward and aft regions of the continuous interior cargo bay, wherein the kinked portion in the fuselage defines a bend angle between the forward centerline and the aft centerline, and wherein the kinked portion is approximately vertically aligned with the lateral pitch axis.

29. The cargo aircraft of example 28, wherein the aft portion extends from the kinked portion at an angle approximately equal to the degree of maximal rotation of the aircraft during the takeoff operation.

30. A fixed-wing, powered, non-buoyant, enclosed cargo aircraft for carrying low-density payloads, the cargo aircraft comprising:
a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay,
wherein the aircraft is capable of short takeoff and landing (STOL) operation carrying a maximum payload weight,
wherein the continuous interior cargo bay defines a volume approximately in the range of about 121,000 cubic feet to about 561,000 cubic feet, and
wherein the maximum payload length is between about 75 meters and 125 meters, the maximum payload length being approximately proportional to the volume of the continuous interior cargo.

31. The cargo aircraft of example 30, wherein the STOL operation comprises performing a taking off operation from a runway in less than about 2,500 feet carrying the maximum payload weight.

32. The cargo aircraft of examples 30 or 31, wherein the STOL operation comprises performing a takeoff operation in less than about 10 times the maximum payload length.

33. The cargo aircraft of any of examples 30 to 32, wherein the continuous interior cargo bay is configured to transport wind turbine blades having a longest linear dimension up to the maximum payload length.

34. The cargo aircraft of any of examples 30 to 33, wherein the fuselage comprises an empennage positioned vertically above an aft portion of the continuous interior cargo bay.

35. The cargo aircraft of any of examples 30 to 34, wherein the takeoff operation at maximum payload weight corresponds to a fully loaded aircraft with a cargo bay volume density less than about 1.0 lbm/ft$^3$.

36. The cargo aircraft of any of examples 30 to 25, wherein the cargo aircraft defines a maximum payload length efficiency of greater than about 90%.

37. The cargo aircraft of example 36, wherein the aircraft defines a maximum payload length efficiency approximately in the range of about 90% to about 97%.

38. The cargo aircraft of any of examples 30 to 37, wherein the fuselage comprises unswept first and second fixed wings.

39. A method of conducting a short runway takeoff operation for a fixed-wing, powered, non-buoyant, enclosed cargo aircraft sized and shaped to carry low-density payloads, the method comprising:
accelerating the fixed-wing cargo aircraft, the cargo aircraft comprising a continuous interior cargo bay spanning more than a majority of a length of a fuselage of the aircraft from a forward end to an aft end and defining a maximum payload length approximately in the range of about 75 meters to about 125 meters;
rotating the fixed-wing cargo aircraft about a lateral pitch axis while the aircraft is still on the ground without striking the fuselage on the ground; and
lifting the aircraft off the ground after traversing less than about 10 payload lengths of runway.

40. The method of example 39, wherein the continuous interior cargo bay spans more than about 90% of the length of the fuselage.

41. The method of examples 39 or 40, wherein the continuous interior cargo bay spans approximately in the range of about 90% to about 97% of the length of the fuselage.

42. The method of any of examples 39 to 41, wherein lifting the aircraft off the ground after traversing less than about 10 payload lengths of runway further includes traversing less than about 2,500 feet of runway.

43. The method of any of examples 39 to 42, wherein the aircraft defines a fuselage kink approximately aligned with the lateral pitch axis such that the rotating orients aircraft aft of the fuselage kink approximately parallel with the ground.

44. The method of any of examples 39 to 43, wherein the continuous interior cargo bay defines a volume between about 121,000 cubic feet and 561,000 cubic feet, the volume being approximately proportional to the maximum payload length.

45. The method of example 44, wherein the continuous interior cargo pay contains a payload, defines a volume, and defines a payload volume density less than about 1.0 lbm/ft$^3$.

46 The method of any of examples 39 to 45, wherein the accelerating the fixed-wing cargo is done entirely using air-breathing propulsion.

47. The method of any of examples 39 to 46, wherein rotating the aircraft comprises applying a rotation force from an empennage positioned vertically above an aft portion of the continuous interior cargo bay.

48. The method of any of examples 39 to 47, wherein lifting the aircraft off the ground is done without using leading edge lift devices on primary wings of the aircraft.

What is claimed is:

1. A fixed-wing, powered, non-buoyant, enclosed cargo aircraft for carrying low-density payloads, the cargo aircraft comprising:
a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay, the fuselage comprising:
a forward portion containing a forward region of the continuous interior cargo bay, the forward portion defining a forward centerline along a longitudinal-lateral plane of the cargo aircraft;
an aft portion containing an aft region of the continuous interior cargo bay, the aft portion defining an aft centerline extending above the longitudinal-lateral plane of the cargo aircraft, a top-most outer surface of the aft portion being angled upwardly relative to the forward centerline; and a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline;

wherein the maximum payload length is approximately in the range of about 75 meters to about 125 meters, and wherein the aircraft is capable of short takeoff and landing (STOL) operation carrying a maximum payload weight.

2. The cargo aircraft of claim 1, further comprising:
an empennage positioned vertically above the aft region of the continuous interior cargo bay.

3. The cargo aircraft of claim 1,
wherein the cargo aircraft defines a lateral pitch axis about which the cargo aircraft is configured to rotate a maximal degree during a STOL operation while the aircraft is on the ground without striking the fuselage on the ground,
wherein the aft portion extends from the kinked portion at an angle approximately equal to the degree of maximal rotation of the aircraft during the takeoff operation, and
wherein the kinked portion is approximately vertically aligned with the lateral pitch axis.

4. The cargo aircraft of claim 1, wherein the aircraft defines a maximum payload length efficiency approximately in the range of about 90% to about 97%.

5. The cargo aircraft of claim 1, wherein the continuous interior cargo bay is configured to transport wind turbine blades having a longest linear dimension up to the maximum payload length.

6. The cargo aircraft of claim 1, wherein the continuous interior cargo bay defines a volume is between about 121,000 cubic feet and 561,000 cubic feet, the volume being approximately proportional to the maximum payload length.

7. The cargo aircraft of claim 1, wherein the short takeoff and landing (STOL) operation is equal to or less than about 10 payload lengths of runway.

8. The cargo aircraft of claim 1, wherein the short takeoff and landing (STOL) operation is equal to or less than about 2,500 feet.

9. The cargo aircraft of claim 1, wherein the kinked portion includes a forward transverse frame section, an aft transverse frame section, and a plurality of longitudinally continuous skin panels extending between the forward transverse frame section and the aft transverse frame section, the plurality of longitudinally continuous skin panels being coextensive with adjacent skin panels of the forward portion of the fuselage and adjacent skin panels of the aft portion of the fuselage.

10. A fixed-wing, powered, non-buoyant, enclosed cargo aircraft for carrying low-density payloads, the cargo aircraft comprising:
a fuselage defining a forward end, an aft end, and a continuous interior cargo bay that spans a majority of a length of the fuselage from the forward end to the aft end, the fuselage including, the continuous interior cargo bay defining a maximum payload length that represents the longest linear dimension of a payload body capable of being enclosed in the continuous interior cargo bay, the aft end of the fuselage including a top-most outer surface that is angled upwardly relative to a forward centerline of the forward end of the fuselage, wherein the aircraft is capable of short takeoff and landing (STOL) operation carrying a maximum payload weight, and wherein the maximum payload length is approximately in the range of about 75 meters to about 125 meters.

11. The cargo aircraft of claim 10, wherein the STOL operation comprises performing a taking off operation from a runway in less than about 2,500 feet carrying the maximum payload weight.

12. The cargo aircraft of claim 10, wherein the STOL operation comprises performing a takeoff operation in less than about 10 times the maximum payload length.

13. The cargo aircraft of claim 10, wherein the continuous interior cargo bay is configured to transport wind turbine blades having a longest linear dimension up to the maximum payload length.

14. The cargo aircraft of claim 10, wherein the continuous interior cargo bay defines a volume is between about 121,000 cubic feet and 561,000 cubic feet, the volume being approximately proportional to the maximum payload length.

15. The cargo aircraft of claim 10, further comprising:
an empennage positioned vertically above an aft portion of the continuous interior cargo bay.

16. The cargo aircraft of claim 10, wherein the STOL operation at maximum payload weight corresponds to a fully loaded aircraft with a cargo bay volume density less than about 1.0 lbm/ft$^3$.

17. The cargo aircraft of claim 10, wherein the cargo aircraft defines a maximum payload length efficiency of greater than about 90%.

18. The cargo aircraft of claim 17, wherein an aft end of the continuous interior cargo bay is configured to receive an aft end of an elongated contiguous payload from a forward end of the fuselage to dispose the elongated contiguous payload throughout substantially all of a length of the continuous interior cargo bay, the elongated contiguous payload having a length equal to the maximum payload length.

19. The cargo aircraft of claim 10, further comprising:
unswept first and second fixed wings.

20. The cargo aircraft of claim 10, wherein the aircraft comprises a configuration selected from the following group of configurations and resultant takeoff performance at maximum payload weight:
the maximum payload length is approximately in the range of about 75 meters and about 85 meters and the aircraft is capable of performing a takeoff operation approximately in the range of within about 7.3 times and about 9.0 times the maximum payload length;
the maximum payload length is approximately in the range of about 85 meters and about 95 meters and the aircraft is capable of performing a takeoff operation approximately in the range of within about 6.5 times and about 7.3 times the maximum payload length;
the maximum payload length is approximately in the range of about 95 meters and about 105 meters and the aircraft is capable of performing a takeoff operation approximately in the range of within about 5.7 times and about 6.5 times the maximum payload length;
the maximum payload length is approximately in the range of about 105 meters and about 115 meters and the aircraft is capable of performing a takeoff operation approximately in the range of within about 5.3 times and about 5.7 times the maximum payload length; and
the maximum payload length is approximately in the range of about 115 meters and about 125 meters and the aircraft is capable of performing a takeoff operation approximately in the range of within about 4.9 times and 5.3 times the maximum payload length.

21. The cargo aircraft of claim 10, wherein the fuselage comprises:
- a forward portion containing a forward region of the continuous interior cargo bay, the forward portion defining a forward centerline along a longitudinal-lateral plane of the cargo aircraft;
- an aft portion containing an aft region of the continuous interior cargo bay, the aft portion defining an aft centerline extending above the longitudinal-lateral plane of the cargo aircraft;
- a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline; and
- wherein the aft region of the continuous interior cargo bay extends along more than about 90% of a length of the aft portion of the fuselage.

22. The cargo aircraft of claim 21,
- wherein the cargo aircraft defines a lateral pitch axis about which the cargo aircraft is configured to rotate a maximal degree during a STOL operation while the aircraft is on the ground without striking the fuselage on the ground,
- wherein the aft portion extends from the kinked portion at an angle approximately equal to the degree of maximal rotation of the aircraft during the takeoff operation, and
- wherein the kinked portion is approximately vertically aligned with the lateral pitch axis.

23. The cargo aircraft of claim 10,
- wherein the fuselage defines a lateral pitch axis about which the cargo aircraft is configured to rotate a maximal degree during a STOL takeoff operation while the aircraft is still on the ground without striking the fuselage on the ground, the fuselage including:
  - a forward portion containing a forward region of the continuous interior cargo bay, the forward portion defining a forward centerline along a longitudinal-lateral plane of the cargo aircraft; and
  - an aft portion extending aft from the lateral pitch axis to the aft end and containing an aft region of the continuous interior cargo bay extending along a majority of a length of the aft portion of the fuselage, the aft portion defining an aft centerline extending above the longitudinal-lateral plane of the cargo aircraft.

24. The cargo aircraft of claim 23,
- wherein an aft end of the aft region of the continuous interior cargo bay is configured to receive an aft end of an elongated contiguous payload from the forward end of the fuselage to dispose the elongated contiguous payload throughout substantially all of the length of the continuous interior cargo bay,
- wherein the elongated contiguous payload defines a maximum length approximately equal to the maximum payload length.

25. The cargo aircraft of claim 23,
- wherein the forward end of the fuselage comprises a cargo nose door configured to move to expose an opening into the continuous interior cargo bay through which an aft end of an elongate contiguous payload can be passed throughout substantially all of the length of the continuous interior cargo and to the aft end of the aft region of the continuous interior cargo bay.

26. The cargo aircraft of claim 23,
- wherein the fuselage comprises a kinked portion forming a junction in the fuselage between the forward portion and the aft portion of the fuselage and between the forward and aft regions of the continuous interior cargo bay,
- wherein the kinked portion in the fuselage defines a bend angle between the forward centerline and the aft centerline, and
- wherein the kinked portion is approximately vertically aligned with the lateral pitch axis.

27. The cargo aircraft of claim 10, wherein an aft region of the continuous interior cargo bay located in the aft end of the fuselage occupies an interior space defined by the aft end of the fuselage such that a portion of the aft region is arranged above an upper surface of the forward end of the fuselage.

28. The cargo aircraft of claim 10, wherein the aft end of the fuselage defines an aft centerline that angles upwardly relative to a forward centerline of the forward end.

29. A method of conducting a short runway takeoff operation for a fixed-wing, powered, non-buoyant, enclosed cargo aircraft sized and shaped to carry low-density payloads, the method comprising:
- accelerating the fixed-wing cargo aircraft, the cargo aircraft comprising a continuous interior cargo bay spanning more than a majority of a length of a fuselage of the aircraft from a forward end to an aft end and defining a maximum payload length approximately in the range of about 75 meters to about 125 meters;
- rotating the fixed-wing cargo aircraft about a lateral pitch axis while the aircraft is still on the ground without striking the fuselage on the ground; and
- lifting the aircraft off the ground after traversing less than about 10 payload lengths of runway.

30. The method of claim 29, wherein the continuous interior cargo bay spans more than about 90% of the length of the fuselage.

31. The method of claim 29, wherein lifting the aircraft off the ground after traversing less than about 10 payload lengths of runway further includes traversing less than about 2,500 feet of runway.

32. The method of claim 29, wherein the aircraft defines a fuselage kink approximately aligned with the lateral pitch axis such that the rotating orients aircraft aft of the fuselage kink approximately parallel with the ground.

33. The method of claim 29, wherein the continuous interior cargo bay defines a volume between about 121,000 cubic feet and 561,000 cubic feet, the volume being approximately proportional to the maximum payload length.

34. The method of claim 33, wherein the continuous interior cargo bay contains a payload, defines a volume, and defines a payload volume density less than about 1.0 lbm/ft$^3$.

35. The method of claim 29, wherein the accelerating the fixed-wing cargo is done entirely using air-breathing propulsion.

36. The method of claim 29, wherein rotating the aircraft comprises applying a rotation force from an empennage positioned vertically above an aft portion of the continuous interior cargo bay.

37. The method of claim 29, wherein lifting the aircraft off the ground is done without using leading edge lift devices on primary wings of the aircraft.

* * * * *